US008990844B2

(12) United States Patent
Oh et al.

(10) Patent No.: US 8,990,844 B2
(45) Date of Patent: Mar. 24, 2015

(54) METHOD AND APPARATUS FOR PROCESSING DIGITAL SERVICE SIGNALS

(71) Applicant: LG Electronics Inc., Seoul (KR)

(72) Inventors: Sejin Oh, Seoul (KR); Jongyeul Suh, Seoul (KR); Byungsun Park, Seoul (KR); Jinpil Kim, Seoul (KR); Kyoungsoo Moon, Seoul (KR); Seungjoo An, Seoul (KR); Kyungho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/936,044

(22) Filed: Jul. 5, 2013

(65) Prior Publication Data

US 2014/0013374 A1    Jan. 9, 2014

Related U.S. Application Data

(60) Provisional application No. 61/668,437, filed on Jul. 5, 2012.

(51) Int. Cl.
*H04H 60/32*      (2008.01)
*H04N 21/2389*    (2011.01)
(Continued)

(52) U.S. Cl.
CPC ..... *H04N 21/23892* (2013.01); *H04N 21/4622* (2013.01); *G06T 1/0085* (2013.01); *H04N 1/32144* (2013.01); *G06T 1/0021* (2013.01); *H04N 1/32331* (2013.01);
(Continued)

(58) Field of Classification Search
CPC ............ H04N 1/32144; H04N 1/3232; H04N 1/32331; H04N 7/26372; H04N 21/23892; H04N 21/8358; G06T 1/0021; G06T 1/0042; G06T 1/005; G06T 1/0071; G06T 1/0085; G06T 1/0092
USPC .................................. 725/9, 18, 19, 20, 136
See application file for complete search history.

(56) References Cited

U.S. PATENT DOCUMENTS 6,505,160 B1 *   1/2003  Levy et al. .................... 725/112
2003/0191941 A1 * 10/2003  Terada et al. ................. 713/176
(Continued)

FOREIGN PATENT DOCUMENTS

KR    10-2008-0089665    10/2008

*Primary Examiner* — Jeremy Duffield
(74) *Attorney, Agent, or Firm* — McKenna Long & Aldridge LLP

(57) ABSTRACT

An apparatus for processing digital service signals includes a receiving module configured to receive contents having watermarks, where the watermarks are inserted in audio or video frames of the contents, the watermarks carry channel information related to the contents, and content information having URL information for additional data of the contents. An extracting module is configured to extract the watermarks from the audio or video frames, and an obtaining module is configured to obtain the additional data over an IP(Internet Protocol) network using the extracted watermarks.

20 Claims, 29 Drawing Sheets

(51) Int. Cl.
*H04N 21/462* (2011.01)
*G06T 1/00* (2006.01)
*H04N 1/32* (2006.01)
*H04N 21/4722* (2011.01)
*H04N 21/478* (2011.01)
*H04N 21/488* (2011.01)
*H04N 21/8358* (2011.01)
*H04N 21/858* (2011.01)

(52) U.S. Cl.
CPC ............ *H04N 1/3232* (2013.01); *G06T 1/0042* (2013.01); *G06T 1/0071* (2013.01); *G06T 1/005* (2013.01); *G06T 1/0092* (2013.01); *H04N 21/4722* (2013.01); *H04N 21/478* (2013.01); *H04N 21/488* (2013.01); *H04N 21/8358* (2013.01); *H04N 21/8586* (2013.01)

USPC ........ 725/19; 725/9; 725/18; 725/20; 725/136

(56) References Cited

U.S. PATENT DOCUMENTS

| | | |
|---|---|---|
| 2003/0196091 A1* | 10/2003 | Raley et al. .................... 713/176 |
| 2005/0021967 A1 | 1/2005 | Bruekers et al. |
| 2006/0018506 A1 | 1/2006 | Rodriguez et al. |
| 2006/0107195 A1* | 5/2006 | Ramaswamy et al. ..... 715/500.1 |
| 2008/0301304 A1 | 12/2008 | Chitsaz et al. |
| 2011/0058707 A1 | 3/2011 | Rhoads et al. |
| 2011/0311128 A1* | 12/2011 | Wilkinson et al. ............ 382/154 |
| 2012/0063635 A1* | 3/2012 | Matsushita et al. ........... 382/100 |
| 2013/0007790 A1* | 1/2013 | McMillan ....................... 725/14 |

* cited by examiner

FIG. 11

| Syntax | No. of bits | format |
|---|---|---|
| ATSC_content_identifier() { | | |
|    TSID | 16 | uimsbf |
|    reserved | 2 | bslbf |
|    end_of_day | 5 | uimsbf |
|    unique_for | 9 | uimsbf |
|    content_id | var | |
| } | | |

FIG. 19
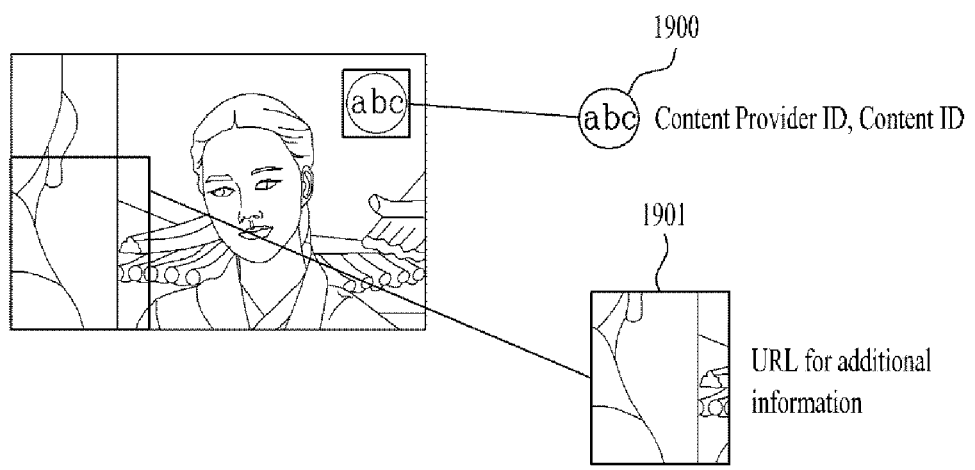
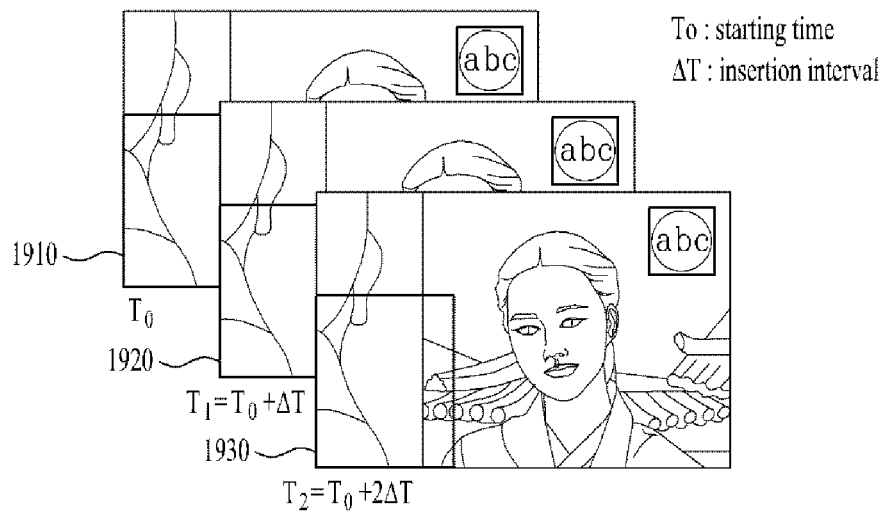

FIG. 25
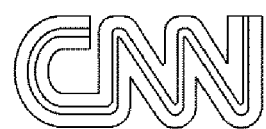  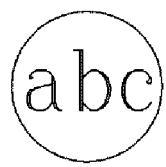
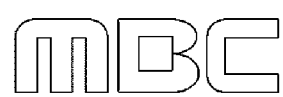  
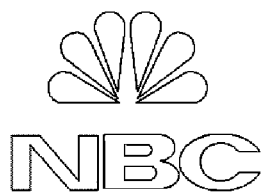 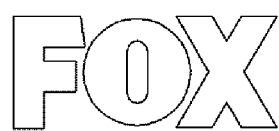 

METHOD AND APPARATUS FOR PROCESSING DIGITAL SERVICE SIGNALS

This application claims the benefit of U.S. Provisional Application No. 61/668,437, filed on Jul. 5, 2012, which is hereby incorporated by reference as if fully set forth herein.

BACKGROUND OF THE INVENTION

1. Field of the Invention

The present invention relates to a method and apparatus for processing an automatic content recognition (ACR) service related to a broadcast program, and more particularly, to a method and apparatus for providing an additional service related to broadcast content in an ACR environment.

2. Discussion of the Related Art

As digital satellite broadcasting has been introduced, digital data broadcasting has appeared as a new supplementary service. An interactive data broadcast, which is a representative interactive service, may transmit not only a data signal but also an existing broadcast signal to a subscriber so as to provide various supplementary services.

A digital data broadcast may be largely divided into an independent service using a virtual channel and a broadcast-associated service via an enhanced TV (ETV). The independent service includes only text and graphics without a broadcast image signal and is provided in a format similar to an existing Internet web page. Representative examples of the independent service include a weather and stock information provision service, a TV banking service, a commercial transaction service, etc. The broadcast-associated service transmits not only a broadcast image signal but also additional text and graphic information. A viewer may obtain information regarding a viewed broadcast program via a broadcast-associated service. For example, there is a service for enabling a viewer to view a previous story or a filming location while viewing a drama.

In a broadcast-associated service of a digital data broadcast, an ETV service may be provided based on ACR technology. ACR means technology for automatically recognizing content via information hidden in the content when a device plays audio/video (A/V content) back.

In implementation of ACR technology, a watermarking or fingerprinting scheme may be used to acquire information regarding content. Watermarking refers to technology for inserting information indicating a digital content provider into digital content. Fingerprinting is equal to watermarking in that specific information is inserted into digital content and is different therefrom in that information regarding a content purchaser is inserted instead of information regarding a content provider.

However, a conventional system for providing an interactive service via an ACR function has several restrictions.

If a content provider (or a broadcaster) transmits content for a real-time service and enhancement data (or additional data) for an ETV service and a TV receiver receives the content for the real-time service and the enhancement data through external input, the content for the real-time service may be received but the enhancement data may not be received.

In addition, if an existing ETV service is provided on an ACR system, intervention of a separate ACR server (or an ACR solution provider) is inevitably required. Therefore, there is a need for a receiver for performing an ACR function alone without a separate ACR server.

In addition, in watermarking technology for providing an ETV service, if the amount of information included in a watermark is large, quality of content in which a watermark is embedded may be deteriorated. Therefore, there is a limitation in efficient use of watermarking.

In addition, in fingerprinting technology for providing an ETV service, an external ACR server for recognizing content is additionally necessary and a content recognition result depends on the size of a reference set.

SUMMARY OF THE INVENTION

Accordingly, the present invention is directed to a method and apparatus for processing an automatic content recognition (ACR) service related to a broadcast program that substantially obviates one or more problems due to limitations and disadvantages of the related art.

An object of the present invention is to identify information regarding a broadcast program using a broadcast system and to provide additional information of the identified broadcast program in real time.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 is a diagram showing the structure of a content identifier (ID) according to an embodiment of the present invention;

FIG. 19 is a diagram showing a method of embedding a profiled watermark according to an embodiment of the present invention;

FIG. 25 is a diagram showing a broadcaster logo according to an embodiment of the present invention;

DETAILED DESCRIPTION OF THE INVENTION

Figure 1:
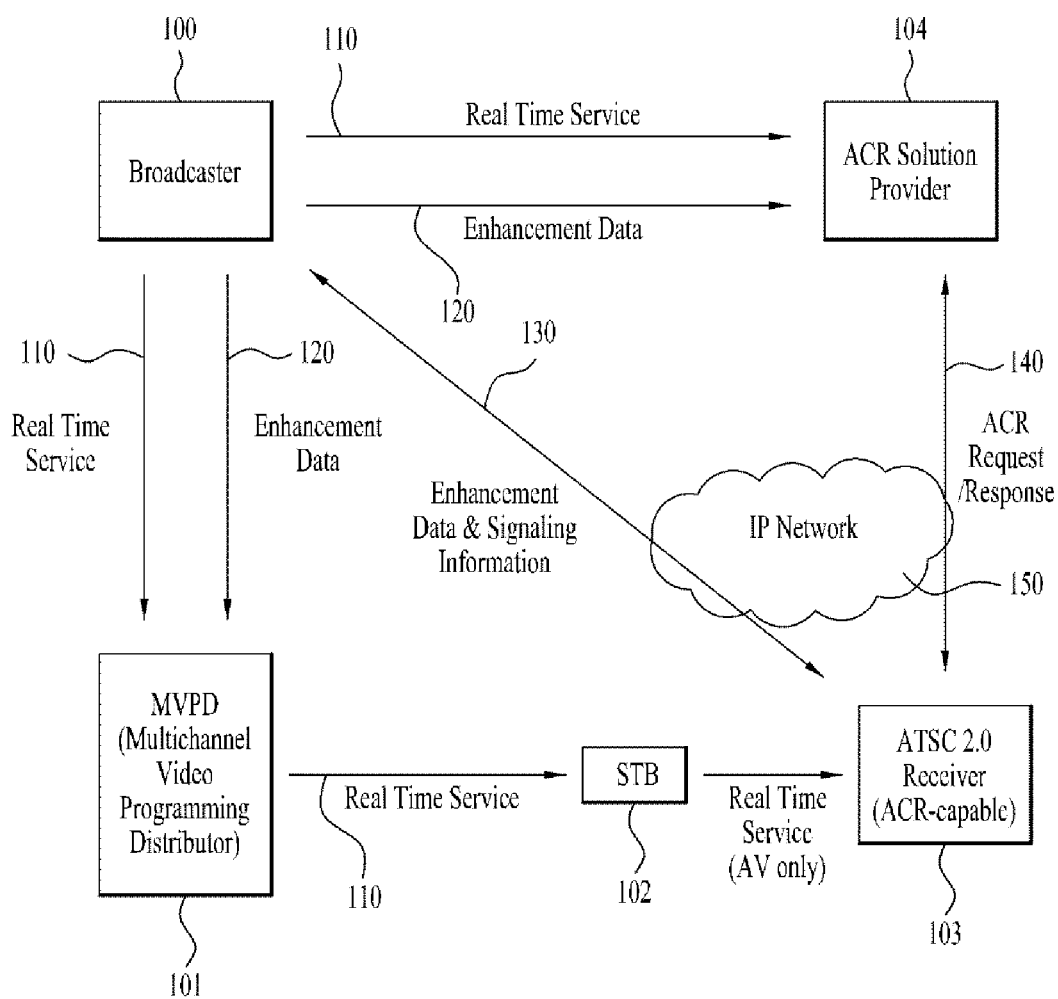
FIG. 1 is a diagram showing an ACR based ETV service system.

Reference will now be made in detail to the preferred embodiments of the present invention, examples of which are illustrated in the accompanying drawings. The configuration and operation of the embodiments of the present invention will be described with reference to the accompanying drawings. The configuration and operation of the present invention shown in the drawings and described hereinafter will be described in at least one embodiment, without limiting the spirit and scope of the present invention.

Although the terms used in the present invention are selected from generally known and used terms, terms used herein may be changed depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

FIG. 1 is a diagram showing an ACR based ETV service system.

The ACR based ETV service system shown in FIG. 1 may include a broadcaster or content provider 100, a multichannel video programming distributor (MVPD) 101, a set-top box (STB) 102, a receiver 103 such as a digital TV receiver, and an ACR server (or an ACR Solution Provider) 104. The receiver 103 may operate according to definition of the advanced television system committee (ATSC) and may support an ACR function. A real-time broadcast service 110 may include A/V content.

A digital broadcast service may be largely divided into a terrestrial broadcast service provided by the broadcaster 100 and a multi-channel broadcast service, such as a cable broadcast or a satellite broadcast, provided by the MVPD 101. The broadcaster 100 may transmit a real-time broadcast service 110 and enhancement data (or additional data) 120 together. In this case, as shown in FIG. 1, the receiver 103 may receive only the real-time broadcast service 110 and may not receive the enhancement data 120 through the MVPD 101 and the STB 102.

Accordingly, in order to receive the enhancement data 120, the receiver 103 analyzes and processes A/V content output as the real-time broadcast service 110 and identifies broadcast program information and/or broadcast program related metadata. Using the identified broadcast program information and/or broadcast program related metadata, the receiver 103 may receive the enhancement data from the broadcaster 100 or the ACR server 104 (140). In this case, the enhancement data may be transmitted via an Internet protocol (IP) network 150.

If the enhancement data is received from a separate ACR server 104 (140), in a mechanism between the ACR server 104 and the receiver 103, a request/response model among triggered declarative object (TDO) models defined in the ATSC 2.0 standard may be applied to the ACR server 104. Hereinafter, the TDO and request/response model will be described.

TDO indicates additional information included in broadcast content. TDO serves to timely triggers additional information within broadcast content. For example, if an audition program is broadcast, a current ranking of an audition participant preferred by a viewer may be displayed along with the broadcast content. At this time, additional information of the current rating of the audition participant may be a TDO. Such a TDO may be changed through interaction with viewers or provided according to viewer's intention.

In the request/response ACR model of the standard ATSC 2.0, the digital broadcast receiver (103) is expected to generate signatures of the content periodically (e.g. every 5 seconds) and send requests containing the signatures to the ACR server (104). When the ACR server (104) gets a request from the digital broadcast receiver (103), it returns a response. The communications session is not kept open between request/response instances. In this model, it is not feasible for the ACR server (104) to initiate messages to the client.

However, in the above-described ETV service system, an ACR function may not be provided without a separate ACR server. Therefore, there is a need for a method of independently performing an ACR function at a receiver without a separate ACR server.

Figure 2:
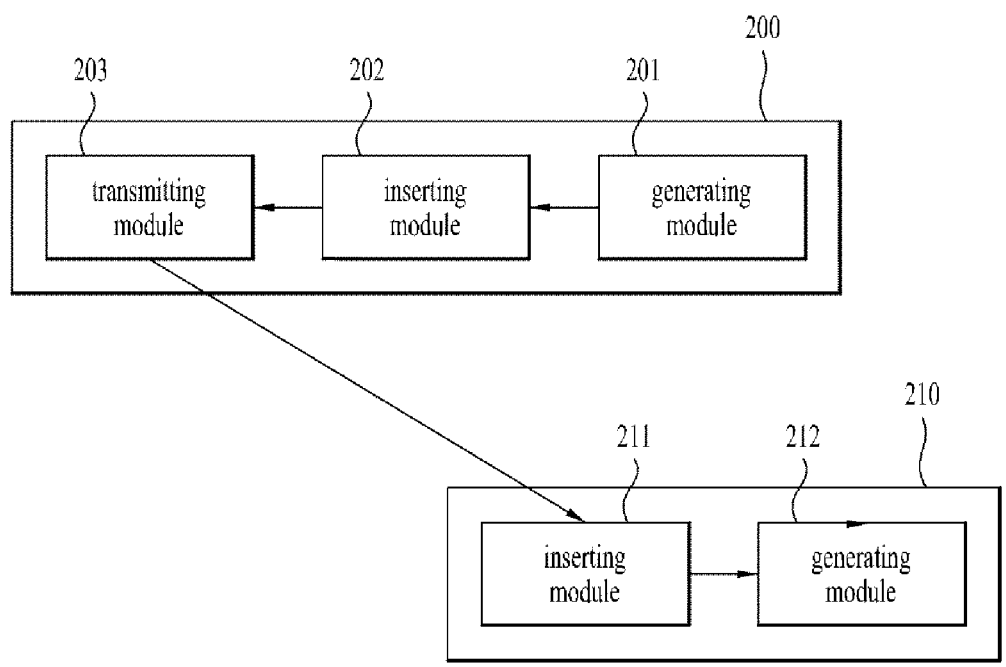
FIG. 2 is a diagram showing an ACR service processing system according to an embodiment of the present invention.

FIG. 2 is a diagram showing an ACR service processing system according to an embodiment of the present invention.

According to the ACR service processing system shown in FIG. 2, enhancement data related to a real-time broadcast may be received using watermarking without intervention of an ACR server to provide an interactive service.

The ACR service processing system shown in FIG. 2 may include a transmitter 200 for generating and transmitting a digital service signal and/or a receiver 210 for receiving and processing a digital service signal. The transmitter 200 may be a content provider or a broadcaster and the receiver 210 may be a receiver such as a digital TV receiver. The transmitter 200 may include a generating module 201, an inserting module 202 and/or a transmitting module 203. The receiver 210 may include a receiving module 211 and/or an extracting module 212.

Hereinafter, operation of each module of the ACR service processing system shown in FIG. 2 will be described.

First, the generating module 201 of the transmitter 200 may generate a watermark and insert the watermark into a frame of A/V content to be transmitted. The watermark may include information about a channel of the content, into which the watermark is inserted, and/or content information (or metadata) such as URL information of enhancement data of content. The transmitting module 203 may transmit the content, into which the watermark is inserted, to the receiver 210.

The receiving module 211 of the receiver 210 may receive the content, into which the watermark is inserted, and deliver the content to the extracting module 212. The extracting module 212 may extract the inserted watermark from an A/V frame of the delivered content.

Figure 3:
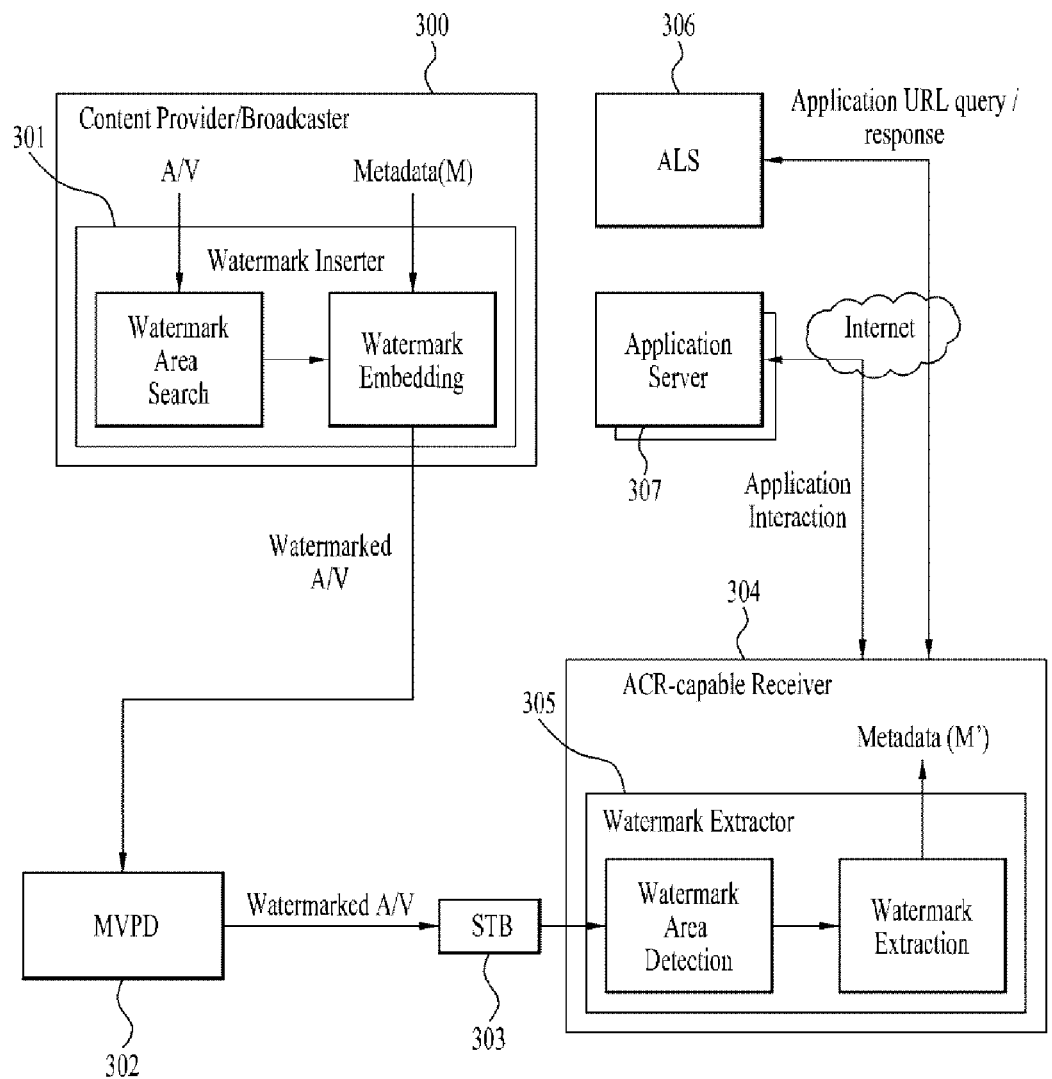
FIG. 3 is a diagram showing an ACR service processing system according to another embodiment of the present invention.

FIG. 3 is a diagram showing an ACR service processing system according to another embodiment of the present invention.

More specifically, FIG. 3 shows an architecture of a broadcast service supporting an ACR based ETV service.

As shown in FIG. 3, the ACR service processing system may include a content provider or broadcaster 300, an MVPD 302, a set-top box 303, a receiver 304, an application URL lookup server (ALS) 306 and an application server (AS) 307. The content provider 300 may include a watermark inserter 301 and the receiver 304 may include a watermark extractor 305. The ALS 306 and the AS 307 are physically subordinate to one server.

The receiver 304 shown in FIG. 3 has an ACR function.

The content provider 300 may insert metadata related to enhancement data into A/V content transmitted in real time in the form of a watermark. Even when A/V content is received via the MVPD 302, A/V content, into which metadata related to enhancement data is inserted in the form of a watermark, may be received. The receiver 304 having the ACR function may extract the watermark from the A/V content received through the MVPD 302 and recognize information about a program broadcast in real time and metadata. The receiver 304 may receive enhancement data via an IP network.

Hereinafter, operation of each component shown in FIG. 3 will be described.

The broadcaster 304 may insert metadata related to enhancement data such as a content ID for identifying content into A/V content in the form of a watermark. More specifically, the watermark inserter 301 searches the A/V content for an area, into which the watermark will be appropriately inserted, and inserts the watermark into the searched area.

The receiver 304 having an ACR function may receive A/V content, into which the watermark is inserted, through the MVPD 302 and the set-top box 303, extract the watermark from the A/V content and obtain metadata related to the enhancement data. More specifically, the watermark extractor 305 of the receiver 304 may search the received A/V content for the area, into which the watermark is inserted, and extract the watermark inserted into the searched area.

The receiver 304 may download the enhancement data related to a real-time broadcast program via the metadata obtained from the extracted watermark. More specifically, the receiver 304 may access the ALS 306 via the IP network to receive a URL of an associated application according to a query. According to the URL of the application, the receiver 304 may access the AS 306 for managing the application and download the enhancement data subordinate to the application from the AS 306.

Figure 4:
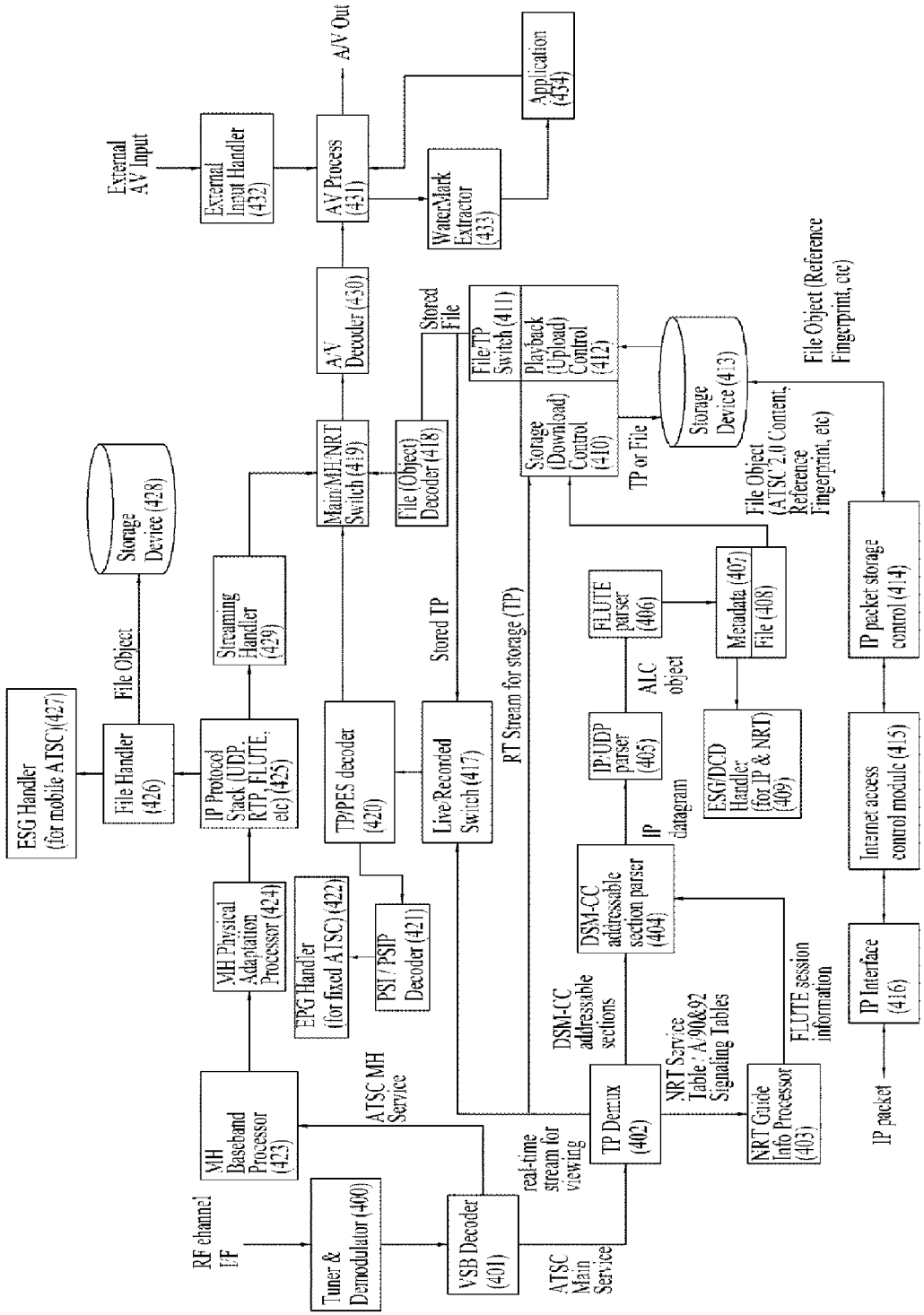
FIG. 4 is a diagram showing the structure of a receiver according to an embodiment of the present invention.

FIG. 4 is a diagram showing the structure of a receiver according to an embodiment of the present invention.

More specifically, FIG. 4 shows an embodiment of the configuration of a receiver supporting an ACR based ETV service using watermarking.

As shown in FIG. 4, the receiver supporting the ACR based ETV service according to the embodiment of the present invention may include an input data processor, an ATSC main service processor, an ATSC mobile/handheld (MH) service processor and/or an ACR service processor. The input data processor may include a tuner/demodulator 400 and/or a vestigial side band (VSB) decoder 401. The ATSC main service processor may include a transport protocol (TP) demux 402, a Non Real Time (NRT) guide information processor 403, a digital storage media command and Control (DSM-CC) addressable section parser 404, an Information Provider (IP)/User Datagram Protocol (UDP) parser 405, a FLUTE parser 406, a metadata module 407, a file module 408, an electronic service guide (ESG)/data carrier detect (DCD) handler 409, a storage control module 410, a file/TP switch 411, a playback control module 412, a first 1 storage device 413, an IP packet storage control module 414, an Internet access control module 415, an IP interface 416, a live/recorded switch 417, a file (object) decoder 418, a TP/Packetized Elementary Stream (PES) decoder 420, a Program Specific Information (PSI)/program and system information protocol (PSIP) decoder 421 and/or an Electronic Program Guide (EPG) handler 422. The ATSC MH service processor may include a main/MH/NRT switch 419, a MH baseband processor 423, an MH physical adaptation processor 424, an IP protocol stack 425, a file handler 426, an ESG handler 427, a second storage device 428 and/or a streaming handler 429. The ACR service processor may include a main/MH/NRT switch 419, an A/V decoder 430, an A/V process module 431, an external input handler 432, a watermark extractor 433 and/or an application 434.

Hereinafter, operation of each module of each processor will be described.

In the input data processor, the tuner/demodulator 400 may tune and demodulate a broadcast signal received from an antenna. Through this process, a VSB symbol may be extracted. The VSB decoder 401 may decode the VSB symbol extracted by the tuner/demodulator 400.

The VSB decoder 401 may output ATSC main service data and MH service data according to decoding. The ATSC main service data may be delivered to and processed by the ATSC main service processor and the MH service data may be delivered to and processed by the ATSC MH service processor.

The ATSC main service processor may process a main service signal in order to deliver main service data excluding an MH signal to the ACR service processor. The TP demux 402 may demultiplex transport packets of ATSC main service data transmitted via the VSB signal and deliver the demultiplexed transport packets to other processing modules. That is, the TP demux 402 may demultiplex a variety of information included in the transport packets and deliver information such that elements of the broadcast signal are respectively processed by modules of the broadcast receiver. The demultiplexed data may include real-time streams, DSM-CC addressable sections and/or an NRT service table/A/90&92 signaling table. More specifically, as shown in FIG. 4, the TP demux 402 may output the real-time streams to the live/recorded switch 417, output the DSM-CC addressable sections to the DSM-CC addressable section parser 404 and output the NRT service table/A/90&92 signaling table to the NRT guide information processor 403.

The NRT guide information processor 403 may receive the NRT service table/A/90&92 signaling table from the TP demux 402 and extract and deliver FLUT session information to the DSM-CC addressable section parser 404. The DSM-CC addressable section parser 404 may receive the DSM-CC addressable sections from the TP demux 402, receive the FLUT session information from the NRT guide information processor 403 and process the DSM-CC addressable sections. The IP/UDP parser 405 may receive the data output from the DSM-CC addressable section parser 404 and parse IP datagrams transmitted according to the IP/UDP. The FLUTE parser 406 may receive data output from the IP/UDP parser 405 and process FLUTE data for transmitting a data service transmitted in the form of an asynchronous layered coding (ALC) object. The metadata module 407 and the file module 408 may receive the data output from the FLUTE parser 406 and process metadata and a restored file. The ESG/DCD handler 409 may receive data output from the metadata module 407 and process an electronic service guide and/or downlink channel descriptor related to a broadcast program. The restored file may be delivered to the storage control module 410 in the form of a file object such as ATSC 2.0 content and reference fingerprint. The file object may be processed by the storage control module 410 and divided into a normal file and a TP file to be stored in the first storage device 413. The playback control module 412 may update the stored file object and deliver the file object to the file/TP switch 411 in order to decode the normal file and the TP file. The file/TP switch 411 may deliver the normal file to the file decoder 418 and deliver the TP file to the live/recorded switch 417 such that the normal file and the TP file are decoded through different paths.

The file decoder 418 may decode the normal file and deliver the decoded file to the ACR service processor. The decoded normal file may be delivered to the main/MH/NRT switch 419 of the ACR service processor. The TP file may be delivered to the TP/PES decoder 420 under the control of the live/recorded switch 417. The TP/PES decoder 420 decodes the TP file and the PSI/PSIP decoder 421 decodes the decoded TP file again. The EPG handler 422 may process the decoded TP file and process an EPG service according to ATSC.

The ATSC MH service processor may process the MH signal in order to transmit ATSC MH service data to the ACR service processor. More specifically, the MH baseband processor 423 may convert the ATSC MH service data signal into a pulse waveform suitable for transmission. The MH physical adaptation processor 424 may process the ATSC MH service data in a form suitable for an MH physical layer.

The IP protocol stack module 425 may receive the data output from the MH physical adaption processor 424 and process data according to a communication protocol for Internet transmission/reception. The file handler 426 may receive the data output from the IP protocol stack module 425 and process a file of an application layer. The ESG handler 427 may receive the data output from the file handler 426 and process a mobile ESG. In addition, the second storage device 428 may receive the data output from the file handler 426 and store a file object. In addition, some of the data output from the IP protocol stack module 425 may become data for an ACR service of the receiver instead of a mobile ESG service according to ATSC. In this case, the streaming handler 429 may process real streaming received via a real-time transport protocol (RTP) and deliver the real streaming to the ACR service processor.

The main/MH/NRT switch 419 of the ACR service processor may receive the signal output from the ATSC main service processor and/or the ATSC MH service processor. The A/V decoder 430 may decode compression A/V data received from the main/MH/NRT switch 419. The decoded A/V data may be delivered to the A/V process module 431.

The external input handler 432 may process the A/V content received through external input and transmit the A/V content to the A/V process module 431.

The A/V process module 431 may process the A/V data received from the A/V decoder 430 and/or the external input handler 432 to be displayed on a screen. In this case, the watermark extractor 433 may extract data inserted in the form of a watermark from the A/V data. The extracted watermark data may be delivered to the application 434. The application 434 may provide an enhancement service based on an ACR function, identify broadcast content and provide enhancement data associated therewith. If the application 434 delivers the enhancement data to the A/V process module 431, the A/V process module 431 may process the received A/V data to be displayed on a screen.

Figure 5:
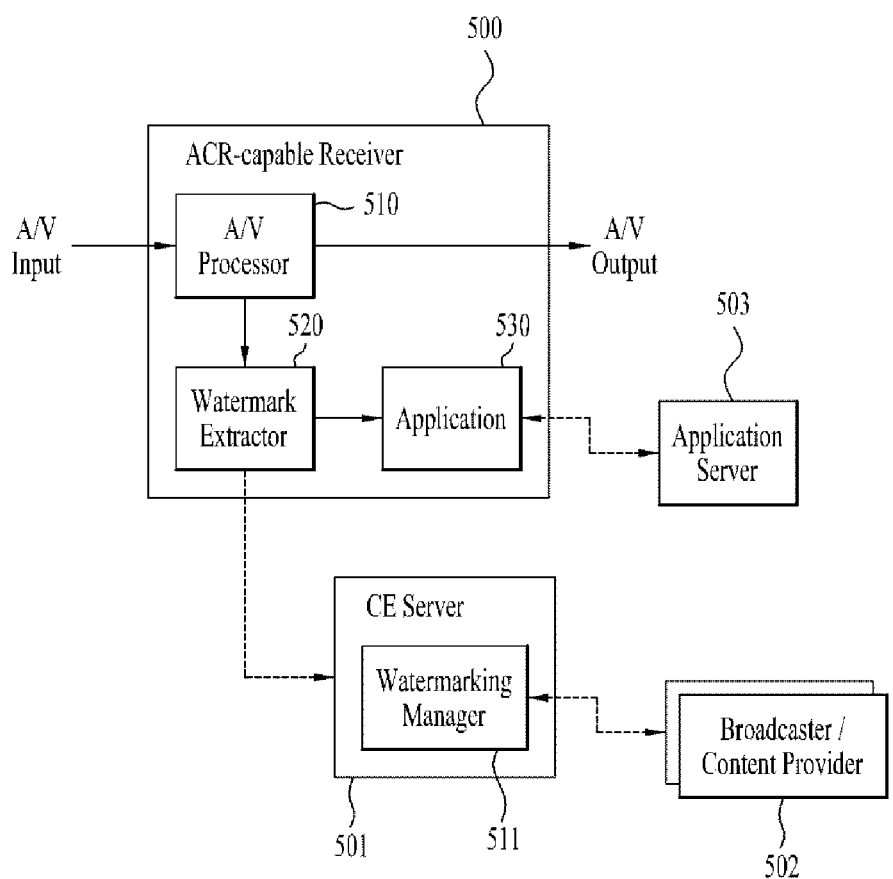
FIG. 5 is a diagram showing the structure of an ACR service processing system according to an embodiment of the present invention.

FIG. 5 is a diagram showing the structure of an ACR service processing system according to an embodiment of the present invention.

More specifically, FIG. 5 shows operation for acquiring program information using a watermark if a receiver 500 receives a terrestrial channel through external input of an external device such as a set-top box.

The ACR service processing system shown in FIG. 5 may include a receiver 500, a CE server 501, a broadcaster or content provider 502 and an application server 503. The receiver 500 may include an A/V processor 510, a watermark extractor 520 and an application module 530. The CE server 501 may include a watermarking manager 511. In addition, the receiver 500 may have an ACR function.

The A/V processor 510 delivers A/V content received through external input to the watermark extractor 520 and the watermark extractor 520 may extract data inserted in the form of a watermark from the A/V content and access the application server 503. At this time, the CE server 501 may manage a watermarking related module and micro-code.

The micro-code according to one embodiment of the present invention refers to code for extracting a watermark inserted into A/V content and may be dynamically downloaded by an A/V decoder chip and/or a raw data processing chip. The receiver may compress and store one or a plurality of micro-codes as necessary or download one or a plurality of micro-codes through a download interface. The download interface may be differently implemented according to chip type.

Hereinafter, operation of each component shown in FIG. 5 will be described.

The watermark extractor 520 of the receiver 500 may extract a watermark from audio content or video content or extract a watermark using audio content and video content. The extracted watermark may include channel information and/or content information. The content information may include information about content used in an ATSC 2.0 service.

The application module 530 may tune to a channel for transmitting content associated with the channel and/or metadata based on channel information and content information extracted from the watermark and receive content information. In addition, the application module 530 may receive content and/or metadata associated with the channel via an IP network. According to one embodiment of the present invention, the channel may include an ATSC message handler (MH) channel.

The CE server 501 may manage and update a watermarking related micro-code and/or software. That is, the CE server 501 may continuously add, delete or update related micro-code and/or software according to a protocol of the broadcaster 500. If a request is received from the receiver 500 or the CE server 501 is updated, the CE server 501 may inform the receiver 500 that the request is received or the CE server 501 is updated and download a new code.

The watermark extractor 520 may be implemented as micro-code or software module operating on a chip of the receiver 500. The new micro-code or software module may be continuously downloaded from the CE server 501.

Figure 6:
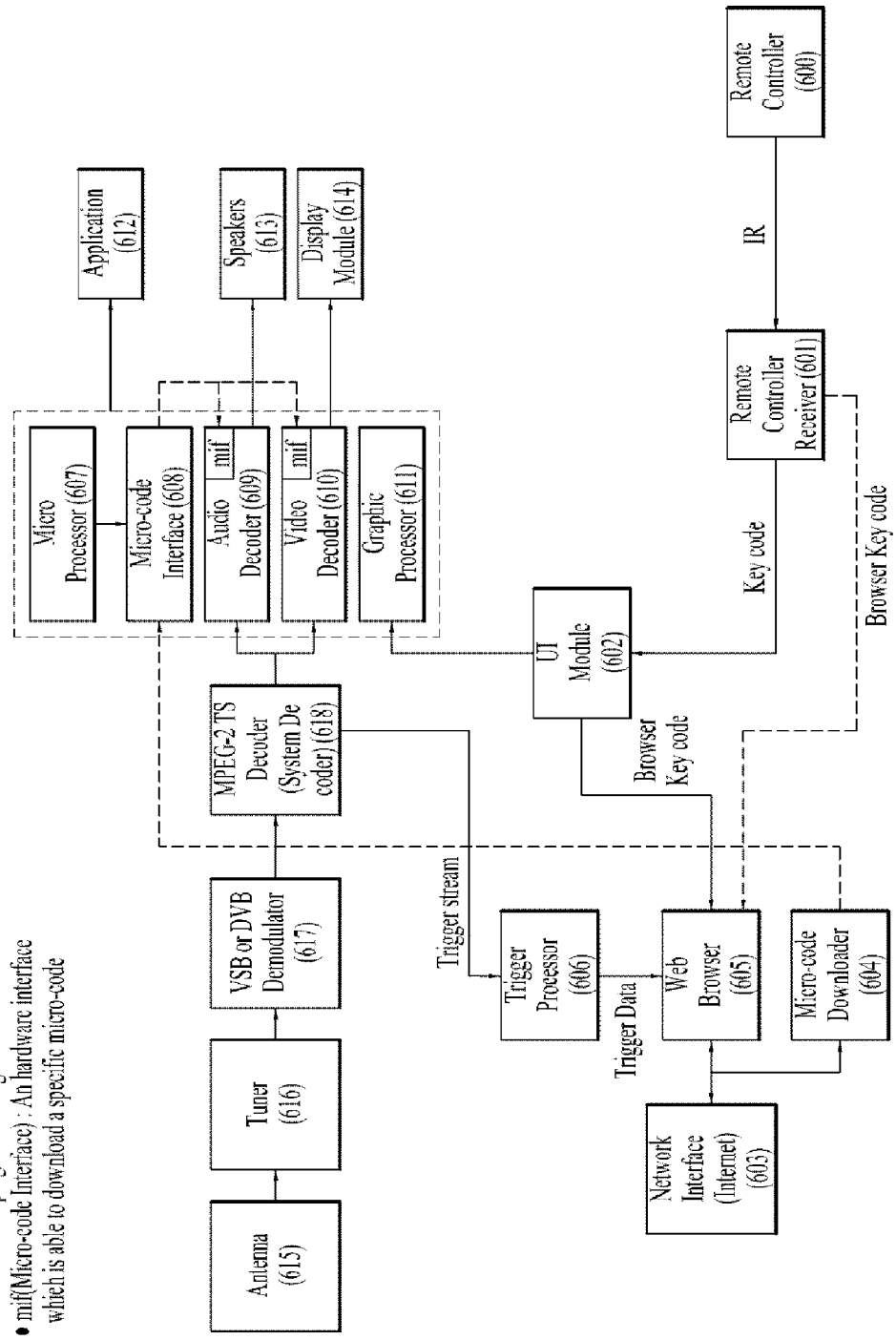
FIG. 6 is a diagram showing the structure of an ETV service reception apparatus according to an embodiment of the present invention.
Figure 7:
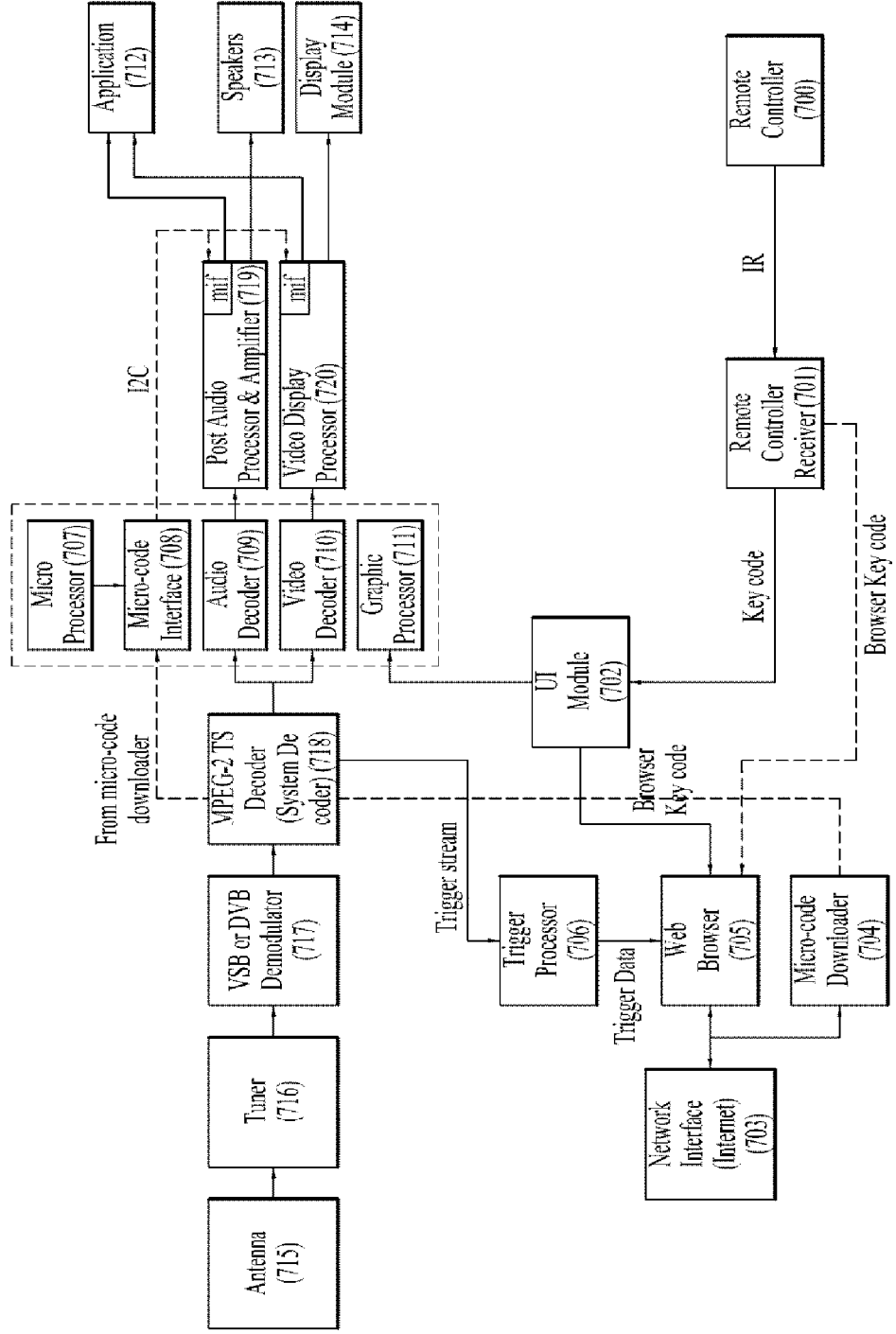
FIG. 7 is a diagram showing the structure of an ETV service reception apparatus according to another embodiment of the present invention.
Figure 8:
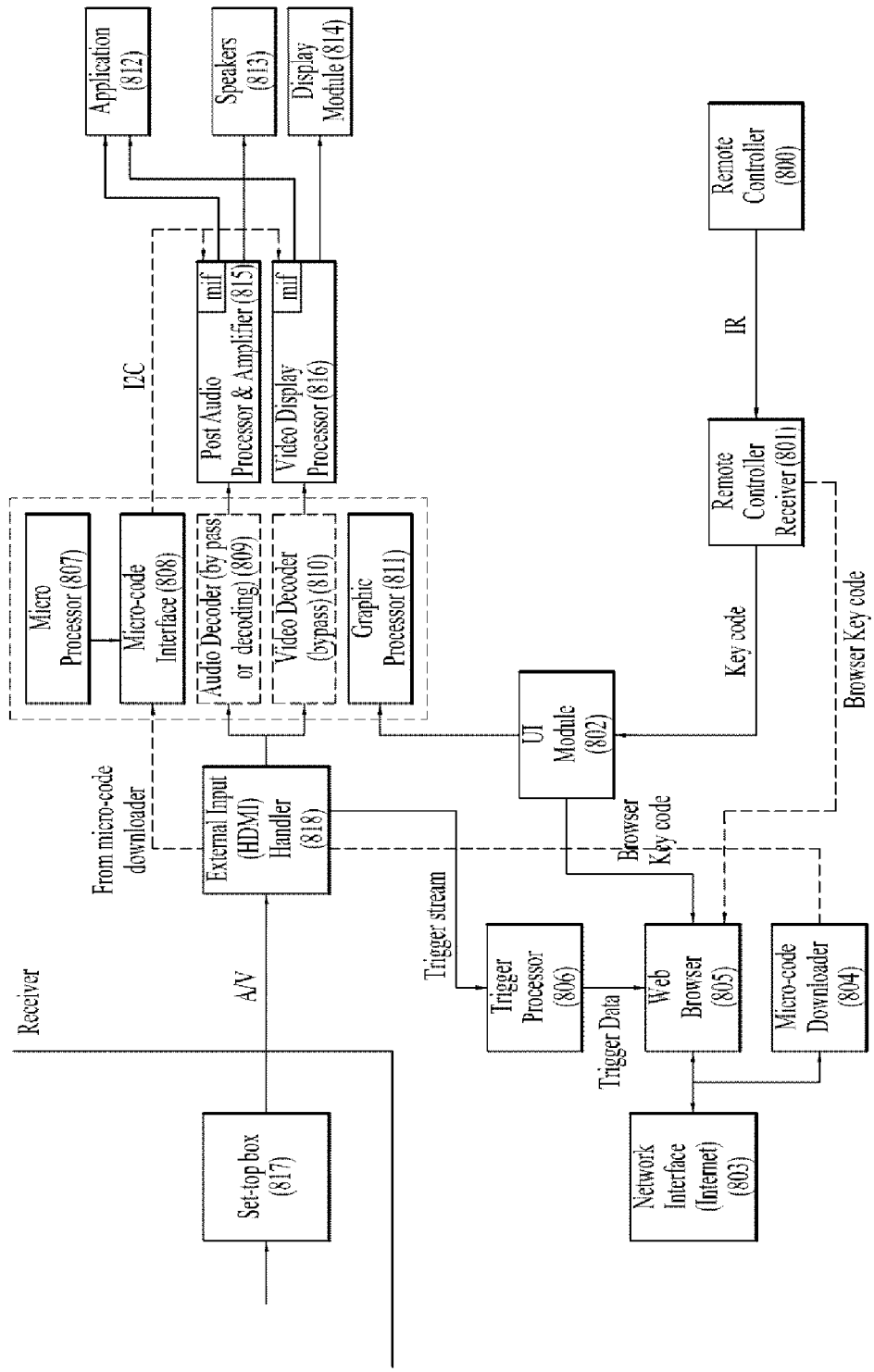
FIG. 8 is a diagram showing the structure of an ETV service reception apparatus according to another embodiment of the present invention.

FIGS. 6 to 8 are diagrams showing the structure of an ETV service reception apparatus according to an embodiment of the present invention.

FIGS. 6 to 8 are diagrams showing the structure of a receiver for extracting a watermark inserted into content in real time based on micro-code in a chip of a video decoder and/or an audio decoder and recognizing content based on the watermark. Hereinafter, the embodiment of the present invention will be described with reference to FIGS. 6 to 8.

FIG. 6 is a diagram showing the structure of an ETV service reception apparatus according to an embodiment of the present invention.

The ETV service reception apparatus according to the embodiment of the present invention shown in FIG. 6 may include a remote controller 600, a remote controller receiver 601, a UI module 602, a network interface 603, a micro-code downloader 604, a web browser 605, a trigger processor 606, a micro processor 607, a micro-code interface (mif) 608, an audio decoder 609, a video decoder 610, a graphics processor 611, an application 612, a speaker 613, a display module 614, an antenna 615, a tuner 616, a demodulator 611, and/or a system decoder 618. The system decoder 618 may be an MPEG-2 TS decoder. The demodulator 617 may be a VSB demodulator or a digital video broadcasting (DVB) demodulator. Each of the audio decoder 609 and the video decoder 610 may include a micro-code interface 608.

As shown in FIG. 6, the ETV service reception apparatus may extract a watermark from A/V content transmitted through a terrestrial wave in real time using micro-code running on a chip of a video decoder or an audio decoder, transmit the extracted watermark to an application and receive an enhancement service. The micro-code may be downloaded from an external device through the micro-code downloader 604. The micro-code may be dynamically downloaded on the chip of the video decoder 609 or the audio decoder 610 via the micro-code interface 608.

Hereinafter, operation between components of the ETV service reception apparatus shown in FIG. 6 will be described.

The remote controller receiver 601 may receive a request signal of a viewer through infrared (IR) light from the remote controller 600 and transmit the signal to the UI module 602 using a key code. The UI module 602 and/or the remote controller receiver 601 may deliver the signal to the web browser 605 using a browser key code. The signal passing through the UI module 602 may be delivered to the graphics processor 601.

The tuner 616 tunes the signal received from the antenna 615 and the demodulator 617 may restore the waveform of the tuned signal. The decoder 618 may decode the restored signal and deliver the decoded signal to the trigger processor 606.

The trigger processor 606 may process the decoded signal to trigger data and transmit the trigger data to the web browser 605.

If the signal delivered to the web browser 605 is delivered to the micro-code downloader 604, the micro-code may be downloaded and delivered to the micro-code interface 608. The micro-code passing through the micro-code interface 608 and the decoded signal may be divided into an audio signal and a video signal which are respectively delivered to the audio decoder 609 and the video decoder 610. The micro-code interface 619 of the audio decoder 609 and the video decoder 610 may extract the watermark inserted into A/V content using the micro-code.

The extracted watermark may be delivered to the application 612, the audio signal may be delivered to the speaker 613 and the video signal may be output to the display module 614 along with the graphic signal received from the graphics processor 611.

FIG. 7 is a diagram showing the structure of an ETV service reception apparatus according to another embodiment of the present invention.

The ETV service reception apparatus according to the embodiment of the present invention shown in FIG. 7 may include a remote controller 700, a remote controller receiver 701, a UI module 702, a network interface 703, a micro-code downloader 704, a web browser 705, a trigger processor 706, a micro processor 707, a micro-code interface (mif) 708, an audio decoder 709, a video decoder 710, a graphics processor 711, an application 712, a speaker 713, a display module 714, an antenna 715, a tuner 716, a demodulator 717, a system decoder 718, an audio postprocessor and amplifier 719 and/or a video display processor 720. According to the embodiment of the present invention, the system decoder 718 may include an MPEG-2 TS decoder. According to the embodiment of the present invention, the demodulator 717 may include a VSB demodulator and/or a DVB demodulator. Each of the audio postprocessor and amplifier 719 and the video display processor 720 may include the micro-code interface 708.

As shown in FIG. 7, the ETV service reception apparatus may extract a watermark inserted into A/V content through micro-code in real time on a post-processing chip instead of the chip of the audio decoder or the video decoder. According to the embodiment of the present invention, the postprocessing chip may include the audio postprocessor and amplifier 719 and the video display processor 720. The ETV service reception apparatus may automatically recognize the A/V content using the extracted watermark. The ETV service reception apparatus may download the micro-code from an external device through the micro-code downloader 704. In addition, the audio or video postprocessing chip of the ETV service reception apparatus may download the micro-code through the micro-code interface 708.

Hereinafter, operation between the components of the ETV service reception apparatus shown in FIG. 7 will be described.

The remote controller receiver 701 may receive a request signal of a viewer through infrared (IR) light from the remote controller 700 and transmit the received signal to the UI module 702 using a key code. The UI module 702 and/or the remote controller receiver 701 may deliver the signal to the web browser 705 using a browser key code. The signal passing through the UI module 702 may be delivered to the graphics processor 701.

The tuner 716 tunes the signal received from the antenna 715 and the demodulator 717 may restore the waveform of the tuned signal. The decoder 718 may decode the restored signal and deliver the decoded signal to the trigger processor 706.

The trigger processor 706 may process the decoded signal into trigger data and transmit the trigger data to the web browser 705.

If the signal delivered to the web browser 705 is delivered to the micro-code downloader 704, the micro-code may be downloaded and delivered to the micro-code interface 708 of the audio postprocessor and amplifier 718 and/or the display processor 720 through the micro-code interface 708.

The decoded signal may be divided into an audio signal and a video signal, which are respectively delivered to the audio decoder 709 and the video decoder 710. The audio signal decoded by the audio decoder 709 may be delivered to the audio postprocessor and amplifier 719. The video signal decoded by the video decoder 710 may be delivered to the video display processor 720.

If the micro-code interface 708 of the audio postprocessor and amplifier 718 and/or the display processor 720 receives the audio signal and/or the video signal through the micro-code interface 708, the watermark inserted into audio and/or video content may be extracted through the micro-code.

The extracted watermark may be delivered to the application 712, the audio signal may be output to the speaker 713 and the video signal may be output to the display module 714.

FIG. 8 is a diagram showing the structure of an ETV service reception apparatus according to another embodiment of the present invention.

The ETV service reception apparatus according to the embodiment of the present invention shown in FIG. 8 may include a remote controller 800, a remote controller receiver 801, a UI module 802, a network interface 803, a micro-code downloader 804, a web browser 805, a trigger processor 806, a micro processor 807, a micro-code interface (mif) 808, an audio decoder 809, a video decoder 810, a graphics processor 811, an application 812, a speaker 813, a display module 814, an audio postprocessor and amplifier 815, a set-top box 817 and an external input handler 818. The external input handler 818 may receive external input through a high definition multimedia interface (HDMI).

As shown in FIG. 8, the ETV service reception apparatus may automatically recognize A/V content using micro-code and receive an ETV service even when the A/V content is not transmitted through a terrestrial wave but is received via an external device such as the set-top box 817. That is, if A/V content is received from an external device, the ETV service reception apparatus may extract a watermark from the A/V content using micro-code in real time. At this time, a video or audio post-processing chip may download the micro-code through the micro-code interface 808. The extracted watermark may be delivered to the application 812 and the receiver may acquire enhancement data using data included in the watermark. According to the embodiment of the present invention, the post-processing chip may include the audio postprocessor and amplifier 815 and/or the video display processor 816.

Hereinafter, operation between the components of the ETV service reception apparatus shown in FIG. 8 will be described.

The remote controller receiver 801 may receive a request signal of a viewer through infrared (IR) light from the remote controller 800 and transmit the received signal to the UI module 802 using a key code. The UI module 802 and/or the remote controller receiver 801 may deliver the signal to the web browser 805 using a browser key code. If the signal delivered to the web browser 805 is delivered to the micro-code downloader 804, the ETV service reception apparatus may download the micro-code and deliver the micro-code to the micro-code interface 808. The signal passing through the UI module 802 may be delivered to the graphics processor 8701.

The signal received from the external device through the set-top box may be processed into trigger data through the trigger processor 806 without being decoded through the external input handler 818 and may be delivered to the web browser 805. Alternatively, the external input signal passing through the external input handler 818 may be divided into an audio signal and a video signal which are respectively delivered to the audio decoder 809 and the video decoder 810. At this time, the audio decoder 809 may decode the audio signal.

The decoded audio signal may be delivered to the audio postprocessor and amplifier 819 and the decoded video signal may be delivered to the video display processor 816. The micro-code interface 808 of the audio postprocessor and amplifier 819 and the display processor 816 may extract the watermark inserted into audio and/or video content using the micro-code.

The extracted watermark may be delivered to the application 812, the audio signal may be output to the speaker 813 and the video signal may be output to the display module 814.

Figure 9:
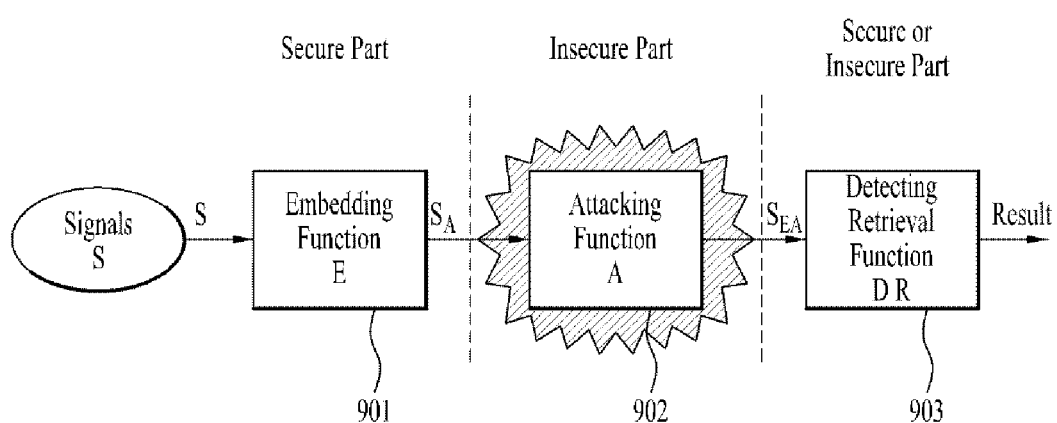
FIG. 9 is a diagram showing the flow of digital watermarking technology according to an embodiment of the present invention.

FIG. 9 is a diagram showing the flow of digital watermarking technology according to an embodiment of the present invention.

Digital watermarking is the process of embedding information into a digital signal in a way that is difficult to remove. The signal may be audio, pictures or video, for example. If the signal is copied, then the information is also carried in the copy. A signal may carry several different watermarks at the same time.

In visible watermarking, the information is visible in the picture or video. Typically, the information is text or a logo which identifies the owner of the media. When a television broadcaster adds its logo to the corner of transmitted video, this is also a visible watermark.

In invisible watermarking, information is added as digital data to audio, picture or video, but it cannot be perceived as such, although it may be possible to detect that some amount of information is hidden. The watermark may be intended for widespread use and is thus made easy to retrieve or it may be a form of Steganography, where a party communicates a secret message embedded in the digital signal. In either case, as in visible watermarking, the objective is to attach ownership or other descriptive information to the signal in a way that is difficult to remove. It is also possible to use hidden embedded information as a means of covert communication between individuals.

One application of watermarking is in copyright protection systems, which are intended to prevent or deter unauthorized copying of digital media. In this use a copy device retrieves the watermark from the signal before making a copy; the device makes a decision to copy or not depending on the contents of the watermark. Another application is in source tracing. A watermark is embedded into a digital signal at each point of distribution. If a copy of the work is found later, then the watermark can be retrieved from the copy and the source of the distribution is known. This technique has been reportedly used to detect the source of illegally copied movies.

Annotation of digital photographs with descriptive information is another application of invisible watermarking.

While some file formats for digital media can contain additional information called metadata, digital watermarking is distinct in that the data is carried in the signal itself.

The information to be embedded is called a digital watermark, although in some contexts the phrase digital watermark means the difference between the watermarked signal and the cover signal. The signal where the watermark is to be embedded is called the host signal.

A watermarking system is usually divided into three distinct steps, embedding 901, attack 902 and detection (often called extraction) 903.

In embedding 901, an algorithm accepts the host and the data to be embedded and produces a watermarked signal.

The watermarked signal is then transmitted or stored, usually transmitted to another person. If this person makes a modification, this is called an attack 902. While the modification may not be malicious, the term attack arises from copyright protection application, where pirates attempt to remove the digital watermark through modification. There are many possible modifications, for example, lossy compression of the data, cropping an image or video, or intentionally adding noise.

Detection 903 is an algorithm which is applied to the attacked signal to attempt to extract the watermark from it. If the signal was unmodified during transmission, then the watermark is still present and it can be extracted. In robust watermarking applications, the extraction algorithm should be able to correctly produce the watermark, even if the modifications were strong. In fragile watermarking, the extraction algorithm should fail if any change is made to the signal.

A digital watermark is called robust with respect to transformations if the embedded information can reliably be detected from the marked signal even if degraded by any number of transformations. Typical image degradations are JPEG compression, rotation, cropping, additive noise and quantization. For video content temporal modifications and MPEG compression are often added to this list. A watermark is called imperceptible if the watermarked content is perceptually equivalent to the original, unwatermarked content. In general it is easy to create robust watermarks or imperceptible watermarks, but the creation of robust and imperceptible watermarks has proven to be quite challenging. Robust imperceptible watermarks have been proposed as tool for the protection of digital content, for example as an embedded 'no-copy-allowed' flag in professional video content.

Digital watermarking techniques can be classified in several ways.

First, a watermark is called fragile if it fails to be detected after the slightest modification (Robustness). Fragile watermarks are commonly used for tamper detection (integrity proof). Modifications to an original work that are clearly noticeable are commonly not referred to as watermarks, but as generalized barcodes. A watermark is called semi-fragile if it resists benign transformations but fails detection after malignant transformations. Semi-fragile watermarks are commonly used to detect malignant transformations. A watermark is called robust if it resists a designated class of transformations. Robust watermarks may be used in copy protection applications to carry copy and access control information.

Second, a watermark is called imperceptible if the original cover signal and the marked signal are (close to) perceptually indistinguishable (Perceptibility). A watermark is called perceptible if its presence in the marked signal is noticeable, but non-intrusive.

Third, about a capacity, the length of the embedded message determines two different main classes of watermarking schemes:

The message is conceptually zero-bit long and the system is designed in order to detect the presence or the absence of the watermark in the marked object. This kind of watermarking schemes is usually referred to as Italic zero-bit or Italic presence watermarking schemes. Sometimes, this type of watermarking scheme is called 1-bit watermark, because a 1 denotes the presence (and a 0 the absence) of a watermark.

The message is a n-bit-long stream (, with n=|m|) or M={0, 1}n and is modulated in the watermark. This kinds of schemes are usually referred to as multiple bit watermarking or non zero-bit watermarking schemes.

Forth, there are several ways for the embedding step. A watermarking method is referred to as spread-spectrum if the marked signal is obtained by an additive modification. Spread-spectrum watermarks are known to be modestly robust, but also to have a low information capacity due to host interference. A watermarking method is said to be of quantization type if the marked signal is obtained by quantization. Quantization watermarks suffer from low robustness, but have a high information capacity due to rejection of host interference.

A watermarking method is referred to as amplitude modulation if the marked signal is embedded by additive modification which is similar to spread spectrum method but is particularly embedded in the spatial domain.

Figure 10:
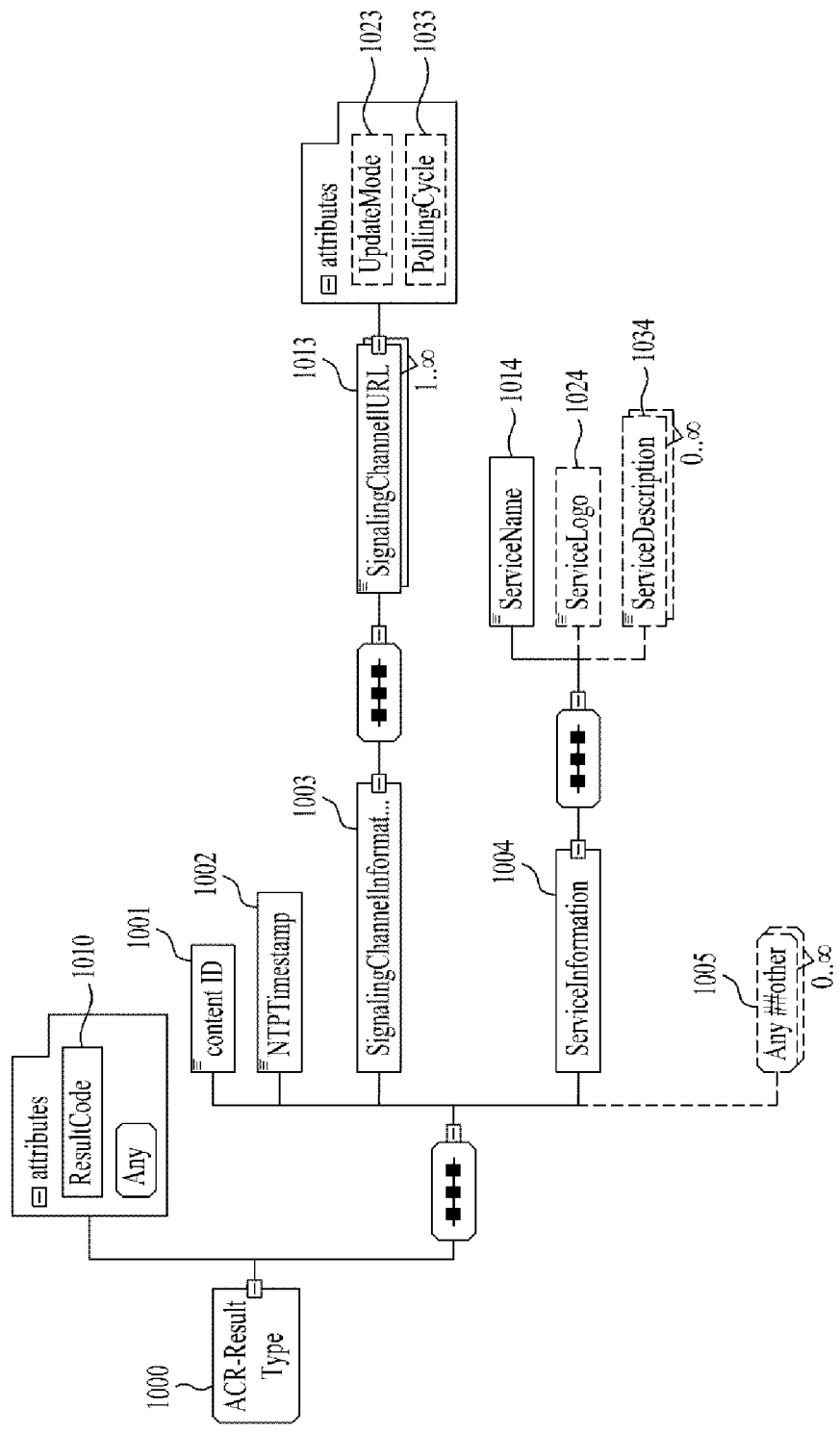
FIG. 10 is a diagram showing an ACR query result format according to an embodiment of the present invention.

FIG. 10 is a diagram showing an ACR query result format according to an embodiment of the present invention.

According to the existing ACR service processing system, if a broadcaster transmits content for a real-time service and enhancement data for an ETV service together and a TV receiver receives the content and the ETV service, the content for the real-time service may be received but the enhancement data may not be received.

In this case, according to the embodiment of the present invention, it is possible to solve problems of the existing ACR processing system through an independent IP signaling channel using an IP network. That is, a TV receiver may receive content for a real-time service via an MVPD and receive enhancement data via an independent IP signaling channel.

In this case, according to the embodiment of the present invention, an IP signaling channel may be configured such that a PSIP stream is delivered and processed in the form of a binary stream. At this time, the IP signaling channel may be configured to use a pull method or a push method.

The IP signaling channel of the pull method may be configured according to an HTTP request/response method. According to the HTTP request/response method, a PSIP binary stream may be included in an HTTP response signal for an HTTP request signal and transmitted through SignalingChannelURL. In this case, a polling cycle may be periodically requested according to Polling_cycle in metadata delivered as an ACR query result. In addition, information about a time and/or a cycle to be updated may be included in a signaling channel and transmitted. In this case, the receiver may request signaling information from a server based on update time and/or cycle information received from the IP signaling channel.

The IP signaling channel of the push method may be configured using an XMLHTTPRequest application programming interface (API). If the XMLHTTPRequest API is used, it is possible to asynchronously receive updates from the server. This is a method of, at a receiver, asynchronously requesting signaling information from a server through an XMLHTTPRequest object and, at the server, providing signaling information via this channel in response thereto if signaling information has been changed. If there is a limitation in standby time of a session, a session timeout response may be generated and the receiver may recognize the session timeout response, request signaling information again and maintain a signaling channel between the receiver and the server.

In order to receive enhancement data through an IP signaling channel, the receiver may operate using watermarking and fingerprinting. Fingerprinting refers to technology for inserting information about a content purchaser into content instead of a content provider. If fingerprinting is used, the receiver may search a reference database to identify content. A result of identifying the content is called an ACR query result. The ACR query result may include a query provided to a TV viewer and answer information of the query in order to implement an ACR function. The receiver may provide an ETV service based on the ACR query result.

Information about the ACR query result may be inserted/embedded into/in A/V content on a watermark based ACR system and may be transmitted. The receiver may extract and acquire ACR query result information through a watermark extractor and then provide an ETV service. In this case, an ETV service may be provided without a separate ACR server and a query through an IP network may be omitted.

FIG. 10 is a diagram of an XML scheme indicating an ACR query result according to an embodiment of the present invention. As shown in FIG. 10, the XML format of the ACR query result may include a result code element 1010 and the ACR query result type 1000 may include a content ID element 1001, a network time protocol (NTP) timestamp element 1002, a signaling channel information element 1003, a service information element 1004 and an other-identifier element 1005. The signaling channel information element 1003 may include a signaling channel URL element 1013, an update mode element 1023 and a polling cycle element 1033, and the service information element 1004 may include a service name element 1014, a service logo element 1024 and a service description element 1034.

Hereinafter, the diagram of the XML schema of the ACR query result shown in FIG. 10 will be described in detail and an example of the XML schema will be described.

The result code element 1010 may indicate a result value of an ACR query. This may indicate query success or failure and a failure reason if a query fails in the form of a code value. For example, if the value of the result code element 1010 is 200, this may indicate that a query succeeds and content information corresponding thereto is returned and, if the value of the result code element 1010 is 404, this may indicate that content is not found.

The content ID element 1001 may indicate an identifier for globally and uniquely identifying content and may include a global service identifier element, which is an identifier for identifying a service.

The NTP timestamp element 1002 may indicate that a time of a specific point of a sample frame interval used for an ACR query is provided in the form of an NTP timestamp. Here, the specific point may be a start point or end point of the sample frame. NTP means a protocol for synchronizing a time of a computer with a reference clock through the Internet and may be used for time synchronization between a time server and client distributed on a computer network. Since NTP uses a universal time coordinated (UTC) time and ensures accuracy of 10 ms, the receiver may accurately process a frame synchronization operation.

The signaling channel information element 1003 may indicate access information of an independent signaling channel on an IP network for an ETV service.

More specifically, the signaling channel URL element 1013, which is a sub element of the signaling channel information element 1003, may indicate URL information of a signaling channel. The signaling channel URL element 1013 may include an update mode element 1023 and a polling cycle element 1033 as sub elements. The update mode element 1023 may indicate a method of acquiring information via an IP signaling channel. For example, in a pull mode, the receiver may periodically perform polling according to a pull method to acquire information and, in a push mode, the server may transmit information to the receiver according to a push method. The polling cycle element 1033 may indicate a basic polling cycle value of the receiver according to a pull method if the update mode element 1023 is a pull mode. Then, the receiver may specify a basic polling cycle value and transmit a request signal to the server at a random time interval, thereby preventing requests from overloading in the server.

The service information element 1004 may indicate information about a broadcast channel. The content ID element 1001 may indicate an identifier of a service which is currently being viewed by a viewer and the service information element 1004 may indicate detailed information about the broadcast channel. For example, the detailed information indicated by the service information element 1004 may be a channel name, a logo, or a text description.

More specifically, the service name element 1014 which is a sub element of the service information element 1004 may indicate a channel name, the service logo element 1024 may indicate a channel logo, and the service description element 1034 may indicate a channel text description.

The following shows the XML schema of elements of the ACR query result shown in FIG. 10 according to the embodiment of the present invention.

```
<xs:complexType name="ACR-ResultType">
    <xs:sequence>
        <xs:element name="ContentID" type="xs:anyURI"/>
        <xs:element name="NTPTimestamp" type="xs:unsignedLong"/>
        <xs:element name="SignalingChannelInformation">
            <xs:complexType>
                <xs:sequence>
                    <xs:element name="SignalingChannelURL"
                        maxOccurs="unbounded">
                        <xs:complexType>
                            <xs:simpleContent>
                                <xs:extension base="xs:anyURI">
                                    <xs:attribute name="UpdateMode">
                                        <xs:simpleType>
                                            <xs:restriction base="xs:string">
                                                <xs:enumeration value="Pull"/>
                                                <xs:enumeration value="Push"/>
                                            </xs:restriction>
                                        </xs:simpleType>
                                    </xs:attribute>
                                    <xs:attribute name="PollingCycle"
                                        type="xs:unsignedInt"/>
                                </xs:extension>
                            </xs:simpleContent>
                        </xs:complexType>
                    </xs:element>
                </xs:sequence>
            </xs:complexType>
        </xs:element>
        <xs:element name="ServiceInformation">
            <xs:complexType>
                <xs:sequence>
                    <xs:element name="ServiceName" type="xs:string"/>
                    <xs:element name="ServiceLogo" type="xs:anyURI"
                        minOccurs="0"/>
                    <xs:element name="ServiceDescription" type="xs:string"
minOccurs="0" maxOccurs="unbounded"/>
                </xs:sequence>
            </xs:complexType>
        </xs:element>
        <xs:any namespace="##other" processContents="skip"
minOccurs="0" maxOccurs="unbounded"/>
    </xs:sequence>
    <xs:attribute name="ResultCode" type="xs:string" use="required"/>
    <xs:anyAttribute processContents="skip"/>
</xs:complexType>
```

FIG. 11 is a diagram showing the structure of a content identifier (ID) according to an embodiment of the present invention.

FIG. 11 shows the syntax structure of the content ID according to the ATSC standard according to the embodiment of the present invention. The ATSC content ID may be used as an identifier for identifying content received by the receiver.

The ATSC Content Identifier is a structure that is composed of a TSID(Transmitting Subscriber Identification) and a "house number" with a period of uniqueness. A "house number" is any number that the holder of the TSID wishes as constrained herein. Numbers are unique for each value of TSID. The syntax of the ATSC Content Identifier structure shall be as defined in FIG. 11.

'TSID', a 16 bit unsigned integer field, shall contain a value of transport_stream_id. The assigning authority for these values for the United States is the FC Ranges for Mexico, Canada, and the United States have been established by formal agreement among these countries. Values in other regions are established by appropriate authorities.

'end_of_day' field, this 5-bit unsigned integer shall be set to the hour of the day in UTC in which the broadcast day ends and the instant after which the content_id values may be re-used according to unique_for. The value of this field shall be in the range of 0-23. The values 24-31 a reserved. Note that the value of this field is expected to be static per broadcaster.

'unique_for' field, this 9-bit unsigned integer shall be set to the number of days, rounded up, measure relative to the hour indicated by end_of_day, during which the content_id value is not reassign to different content. The value shall be in the range 1 to 511. The value zero shall be forbidden. The value 511 shall have the special meaning of "indefinitely". Note that the value of this field is expected to be essentially static per broadcaster, only changing when the method of house numbering is changed. Note also that decoders can treat stored content_values as unique until the unique_for fields expire, which can be implemented by decrementing all stored unique_for fields by one every day at the end_of_day until they reach zero.

'content_id' field, this variable length field shall be set to the value of the identifier according to the house number system or systems for the value of TSID. Each such value shall not be assigned to different content within the period of uniqueness set by the values in the end_of_day an unique_for fields. The identifier may be any combination of human readable and/or binary values and need not exactly match the form of a house number, not to exceed 242 bytes 1.

Figure 12:
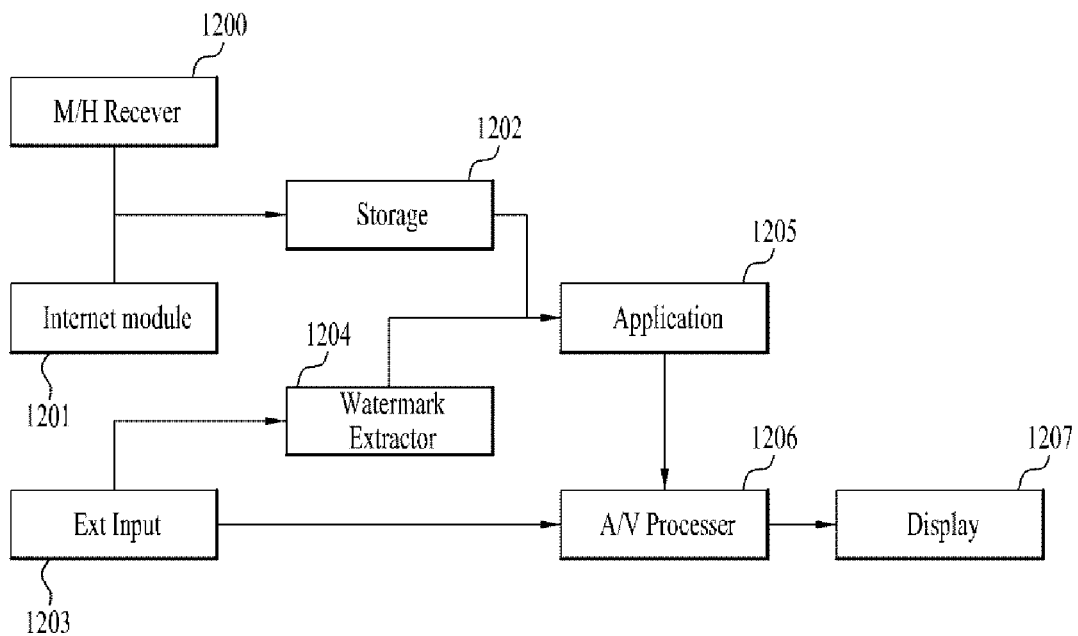
FIG. 12 is a diagram showing operation of a receiver using watermarking according to an embodiment of the present invention.

FIG. 12 is a diagram showing operation of a receiver using watermarking according to an embodiment of the present invention.

As a method of providing an ETV service supporting an ACR function, in the present invention, a method using watermarking is proposed. FIG. 12 is a diagram showing operation between modules of a receiver for performing an ACR function using watermarking.

As shown in FIG. 12, a receiver using watermarking may include a Mobile/Handheld (M/H) receiving module 1200, an Internet module 1201, a storing module 1202, an external input module 1203, a watermark extracting module 1204, an application module 1205, an A/V processing module 1206 and a displaying module 1207.

As shown in FIG. 12, the receiver may recognize a content provider (CP) using a watermark and process an enhancement service provided by the recognized CP.

In the receiver according to the embodiment of the present invention, the watermark extracting module 1204 may extract a watermark from an A/V signal received by the M/H receiving module 1200 through external input and obtain content information included in the A/V signal. The content information, which may be included in the watermark according to the embodiment of the present invention, will be described below.

The extracted content information may be displayed to a viewer through the application module 1205 and the viewer may selectively receive enhancement data for an enhancement service through M/H or Internet using the displayed content information.

Although not shown in FIG. 12, the received enhancement data may be stored in the storing module 1202 to be used for an ACR service. In this case, the content information and metadata are stored in the storing module 1202 and the stored content information and metadata may be used to receive related enhancement data upon A/V playback. Alternatively, the receiver may access the content provider or newly receive enhancement data through M/H tuning upon A/V playback.

Hereinafter, operation of each module shown in FIG. 12 will be described and then content information which may be extracted from the watermark will be described.

The M/H receiving module 1200 may receive enhancement data from the content provider through an M/H signal.

The Internet module 1201 may receive enhancement data from the content provider via the Internet.

The storing module 1201 may store data including A/V information and/or enhancement data received from the content provider. If the watermark extracting module 1204 extracts a watermark, the watermark may be displayed and stored in the storage device as special metadata.

The external input module 1203 may receive an A/V signal of the content provider through external input.

The watermark extracting module 1204 may extract a watermark from the A/V signal received by the external input module 1203. If content is stored in the storage of the TV and is then played back, the watermark may be extracted upon playback.

The application module 1205 may receive the watermark extracted by the watermark extracting module 1204 from data including A/V information and/or enhancement data received from the content provider and stored in the storing module 1201 and process the data including the A/V information and/or the enhancement data using the information about the watermark.

The A/V processing module 1206 may decode the A/V signal through an audio decoder and/or a video decoder to process data received from the application module 1205.

The displaying module 1207 may display the data processed by the A/V processing module 1206 on a screen of the receiver in an on screen display (OSD) manner.

Hereinafter, content information according to one embodiment of the present invention will be described.

The content information extracted through the watermark may include information about a content provider. More specifically, the content information may include ID information of a content provider or a broadcaster, ID information of content, information about a time of content, content life cycle information and/or information about enhancement data. In an ACR service using fingerprinting according to one embodiment of the present invention, an ACR query result may be used as metadata for content acquired via an ACR function.

The CP ID information may mean an identifier for identifying a content provider or a broadcaster. According to the embodiment of the present invention, the CP ID information may serve as a primary identifier. The CP ID information may include a collection of a serial number for identifying a producer name and a producer and/or a serial number for identifying a country, a region and a service property (genre).

According to one embodiment of the present invention, a TS-id used for an ATSC program and system information protocol (PSIP) may be used as CP ID information.

The content ID information may mean an identifier for identifying content instead of a content provider. More specifically, the content ID information may include a collection of a serial number for identifying a content name and content and a serial number for identifying a content property (genre). According to one embodiment of the present invention, an event-id used for an ATSC PSIP may be used as content ID information.

The CP ID information may be included in the watermark with a frequency higher than that of the content ID information and may be configured to be more easily extracted. In this case, the CP ID information may include more compressed information or more detailed information.

The time information may indicate time information related to content. More specifically, the time information may include a start time, a duration time, an end time and/or a lead time meaning a total service playback time. According to one embodiment of the present invention, the time information may be based on UTC or GPS and may be configured in another format such as an STT of an ATSC PSIP. In addition, the time information may be used for synchronization in a display process when a service such as a synchronized widget is provided. In addition, the time information may be used for content rescheduled by a cable or satellite personal video recorder (PVR) set-top box.

The content life cycle information may include information about a life cycle within which a service is valid.

The information about the enhancement data may include information about presence/absence of enhancement data and usage of a watermark and/or information about a path for receiving enhancement data. More specifically, the information about the enhancement data may include information about presence of enhancement data provided by a content provider and information indicating whether a watermark is used for a license for preventing illegal copy and distribution, audience rating survey, or content provider recognition for an additional service. Information about a path for receiving enhancement data may include information indicating whether an IP network is used or another medium such as a mobile device is used. More specifically, if enhancement data is received via an IP network, an IP address and/or URL information may be included and, if enhancement data is received via a mobile device, frequency information, standard (ATSC MH, DMB, media flow, DVB-H, NGH, etc.) information and/or channel information may be included.

Figure 13:
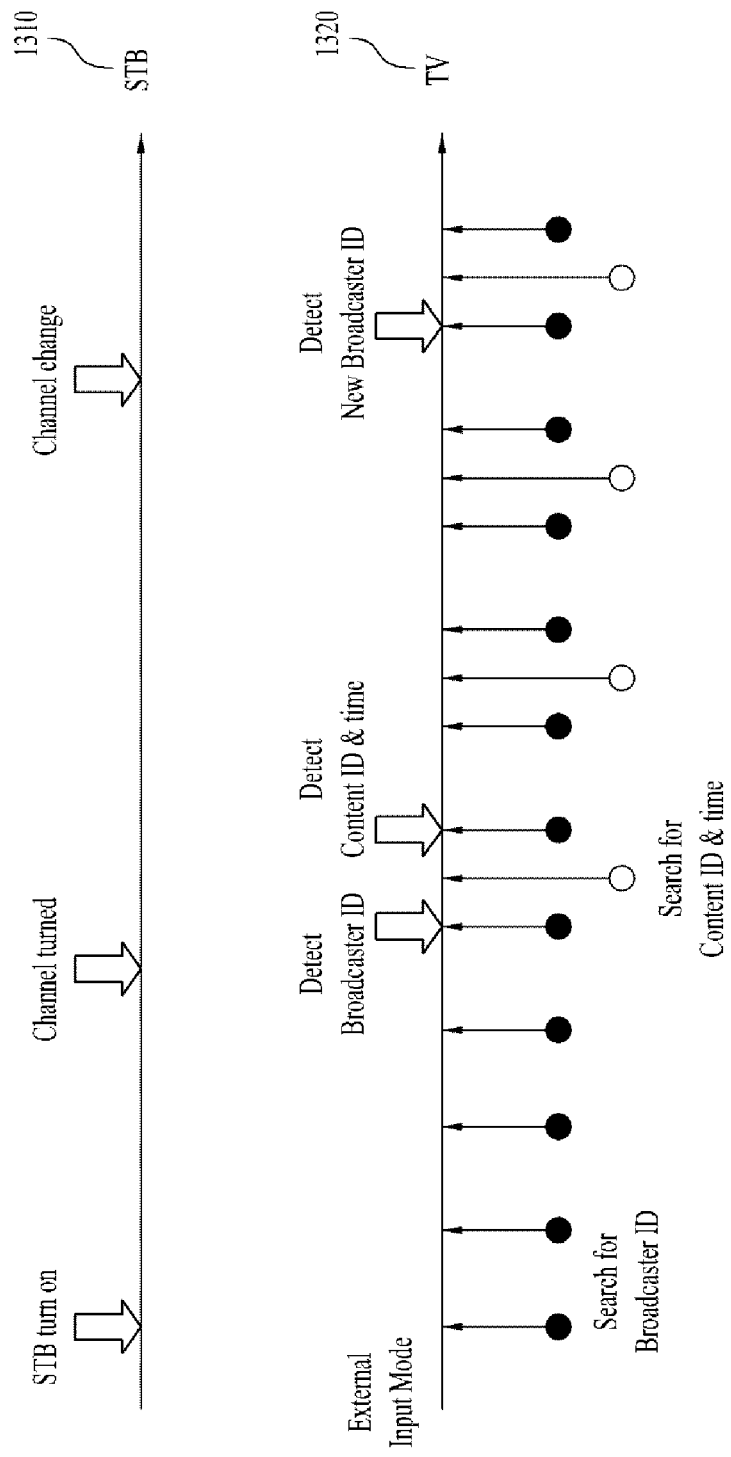
FIG. 13 is a diagram showing a watermark extracting process according to an embodiment of the present invention.

FIG. 13 is a diagram showing a watermark extracting process according to an embodiment of the present invention.

A receiver 1320 such as a general digital TV receiver receives an A/V signal from a cable or satellite set-top box 1310 mounted in the receiver 1320 through an HDMI or component connection. Hereinafter, according to the embodiment of the present invention shown in FIG. 13, operation for extracting a watermark and recognizing a CP will be described in stages in the set-top box 1310 and the receiver 1320.

If an input mode of the receiver 1320 is set to an external input mode, the receiver 1320 may search for a CP ID for identifying a content provider or a broadcaster. If the set-top box 1310 is turned on and a channel is tuned to, the receiver 1302 may detect a CP ID. The receiver 1302 may detect a content ID and time information of content provided by the detected content provider. If the channel of the service received from the set-top box 1310 is changed, the receiver 1320 may newly search for a CP ID for identifying a content provider according to the changed channel.

Figure 14:
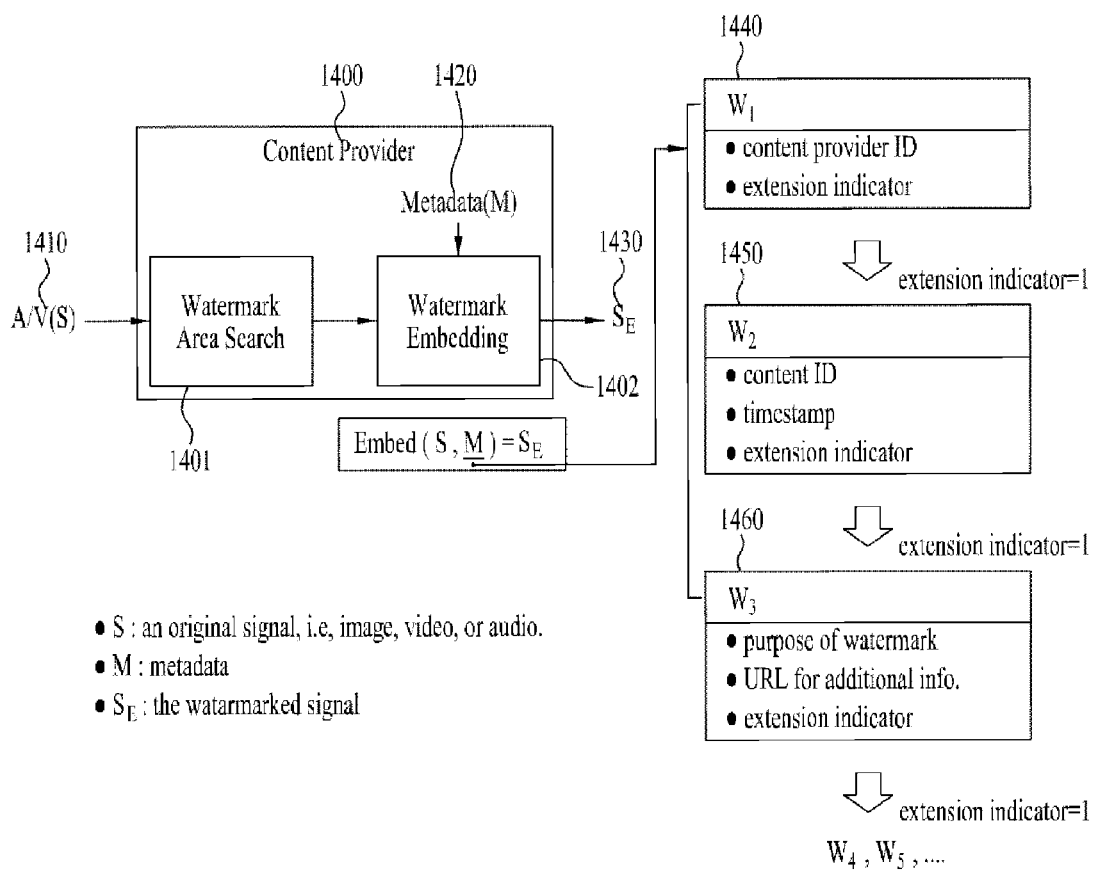
FIG. 14 is a diagram showing profiling of watermark information according to an embodiment of the present invention.

FIG. 14 is a diagram showing profiling of watermark information according to an embodiment of the present invention.

As described with reference to FIGS. 12 and 13, the receiver according to one embodiment of the present invention may recognize a CP using a watermark for transmitting CP information included in A/V content. In this case, if the amount of information stored in the watermark is increased, quality of A/V content into which the watermark is inserted may be deteriorated. Accordingly, in the present invention, in order to solve such a problem, a method of profiling and leveling a watermark according to attributes of information stored in the watermark and inserting the leveled watermark into A/V content is proposed. In this case, since the leveled watermark is differentiated according to attributes of the stored information and is inserted into the A/V content, the amount of information about the inserted watermark may be adjusted to prevent the quality of content from being deteriorated.

Accordingly, in the present invention, in order to level a watermark according to profiling, the watermark may be divided into a basic profile watermark and an extended profile watermark according to attributes of information stored in the watermark. The basic profile watermark may include information essentially necessary to recognize a real-time broadcast program in order to perform an ACR function. The extended profile watermark may include additional information instead of information essentially necessary to perform an ACR function. A plurality of extended profile watermarks may be present and may be leveled again according to attributes of information. In this case, the basic profile watermark and the extended profile watermark may be inserted into A/V content according to different cycles.

FIG. 14 is a diagram showing a process of inserting a leveled watermark into A/V content as described above.

As described above, a content provider 1400 may receive an original signal 1410 such as video/audio, search for a region into which a watermark will be inserted (1401) and embed, in a watermark, metadata 1420 related to content to be provided (1402). Thereafter, the content provider 1400 may transmit the watermarked signal 1430 to a receiver. In the watermarked signal 1430, the original signal 1410 and the metadata 1420 may be stored in the form of a watermark. In one embodiment, the watermark of FIG. 14 may include a basic profile watermark $W_1$ 1440 and first and second extended profile watermarks $W_2$ and $W_3$ 1450 and 1460.

The basic profile watermark 1440 may include a content provider ID element and an extension indicator.

The content provider ID element may indicate information for identifying a broadcaster or a CP for providing content.

The extension indicator element may indicate whether a watermark of a next level, that is, a first extended profile watermark 1450, is additionally inserted. If the value of the extension indicator element is 1, this indicates that the first extended profile watermark 1450 of the next level is inserted.

The first extended profile watermark 1450 may include a content ID element, a timestamp element and an extension indicator element.

The content ID element may indicate serial number information for identifying a content name or content.

The timestamp element indicates time information of content.

The extension indicator element may indicate whether a watermark of a next level, that is, a second extended profile watermark 1460, is additionally inserted as described above. As shown in FIG. 14, the second extended profile watermark 1460 may include a watermark insertion usage element, a URL element of additional information and an extension indicator element.

The watermark insertion usage element may indicate information about watermark insertion usage.

The URL element of the additional information may indicate additional information or URL information for receiving a service.

The extension indicator element may indicate whether a watermark of a next level is inserted.

As shown in FIG. 14, a content provider or a broadcaster may differentiate the number of times of inserting the watermark into the A/V content according to watermark profiling when the leveled watermark is inserted into the A/V content. For example, since the basic profile watermark 1440 includes important basic information of a broadcast program, the content provider or the broadcaster may set the number of times of inserting the basic profile watermark such that the receiver accurately recognizes information as soon as possible.

That is, the content provider or the broadcaster may insert basic profile watermarks 1440 more than extended profile watermarks 1450 and 1460 during a transmission cycle of the watermarked signal 1430. Accordingly, the receiver may preferentially extract the basic profile watermark 1440 and then extract the extended profile watermarks 1450 and 1460 as necessary. In this case, the receiver may check presence of the extended profile watermark according to the value of the extension indicator element and extract the extended profile watermark. That is, the receiver may discriminatorily extract watermarks discriminatorily inserted according to the profile of the watermark and efficiently store and manage information included in the watermark.

Up to now, a method and system for providing an ACR service using watermarking according to an embodiment of the present invention has been described. Hereinafter, a method of embedding a watermark in content at a content provider and a method of extracting a watermark from content at a receiver according to an embodiment of the present invention will be described in detail.

A method of embedding a watermark in a video frame at a content provider and a method of extracting a watermark from content at a receiver will be described with reference to FIGS. 15 to 17 and a method of embedding a watermark in an audio frame at a content provider and a method of extracting a watermark from content at a receiver will be described with reference to FIG. 18.

Figure 15:
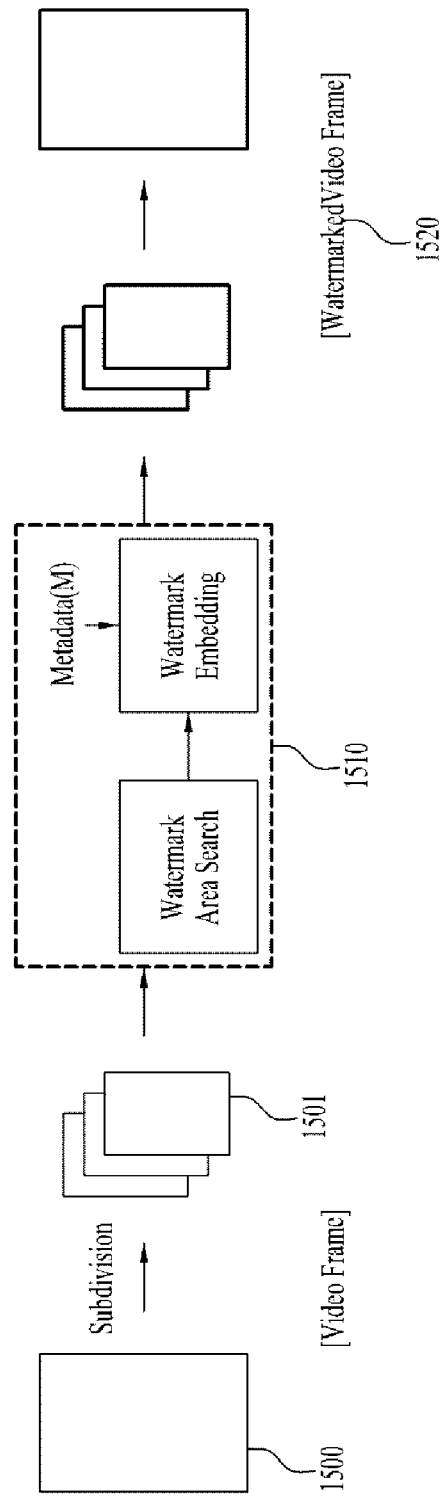
FIG. 15 is a diagram showing a method of embedding a watermark in a video frame according to an embodiment of the present invention.

FIG. 15 is a diagram showing a method of embedding a watermark in a video frame according to an embodiment of the present invention.

A content provider first subdivides one video frame 1500 into subframes 1501, searches for the subdivided subframes 1502, and determines an area in which a watermark will be appropriately embedded. If a subframe area in which a watermark will be embedded is determined, the watermark is embedded in the subframe area (1510) and the subframes are combined to regenerate one video frame (1520).

In order to extract the watermark from the video frame embedded in the overall area of one video frame at the receiver, first, the receiver subdivides one video frame into subframes. An area in which the watermark may be embedded is detected from the subdivided subframes. The watermark is extracted from the detected subframe area and the extracted watermarks are compared to finally determine one watermark. Enhancement data may be downloaded using content information through the determined watermark.

Figure 16:
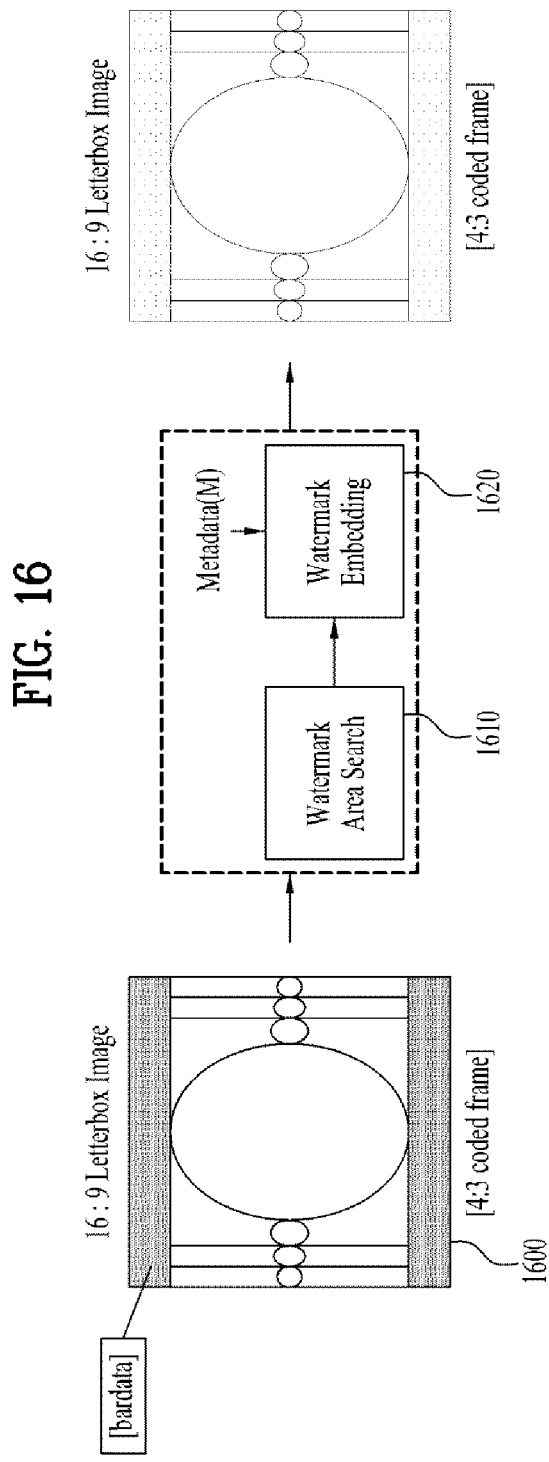
FIG. 16 is a diagram showing a method of embedding a watermark in a video frame according to another embodiment of the present invention.

FIG. 16 is a diagram showing a method of embedding a watermark in a video frame according to another embodiment of the present invention.

More specifically, FIG. 16 shows a method of embedding a watermark in a bar data area of a video frame according to an embodiment of the present invention.

If a watermark is embedded in the overall area of one video frame, watermarking robustness may be improved but processing necessary to extract the watermark at the receiver may be increased. Therefore, by embedding the watermark in some areas of the video frame, it is possible to decrease processing necessary to extract the watermark at the receiver so as to improve operation efficiency of the receiver. Some areas, in which the watermark will be embedded, of the overall area of the video frame may be predefined according to the rules of the transmitter/receiver. Hereinafter, according to the embodiment of the present invention, the content provider may embed the watermark in the bar data area which is a part of the overall area of the video frame.

When the content provider transmits content to the receiver, if an image ratio of content mismatches a transmission format, a bar data area 1600 may be generated on a screen. For example, as shown in FIG. 16, in case of converting a video frame having an aspect ratio of 16:9 into an aspect ratio of 4:3, black bands may be generated in upper and lower edges of a screen having the aspect ratio of 4:3 so as not to crop the left and right edges of the screen. The area of the black band may be the bar data area 1600 which is called a letterbox.

As shown in FIG. 16, in case of a video frame in which the bar data area 1600 is present, the watermark may be embedded in the bar data area 1600 to be transmitted. The method of embedding the watermark in the bar data area may be performed equally to the process of embedding the watermark in the video frame described with reference to FIG. 15.

More specifically, the content provider may search for the bar data area 1600 of the video frame, in which the watermark will be embedded, (1600) and embed the watermark in the bar data area 1600 (1620).

In order to extract the watermark embedded in some areas of the video frame, first, the receiver subdivides one video frame into subframes. An area in which the watermark may be embedded is detected from the subdivided subframes. According to the embodiment of the present invention shown in FIG. 16, the receiver may detect the bar data area from the subdivided subframes. The watermark is extracted from the detected subframe area and the extracted watermarks are compared to finally determine one watermark. Enhancement data may be downloaded using content information through the determined watermark.

Figure 17:
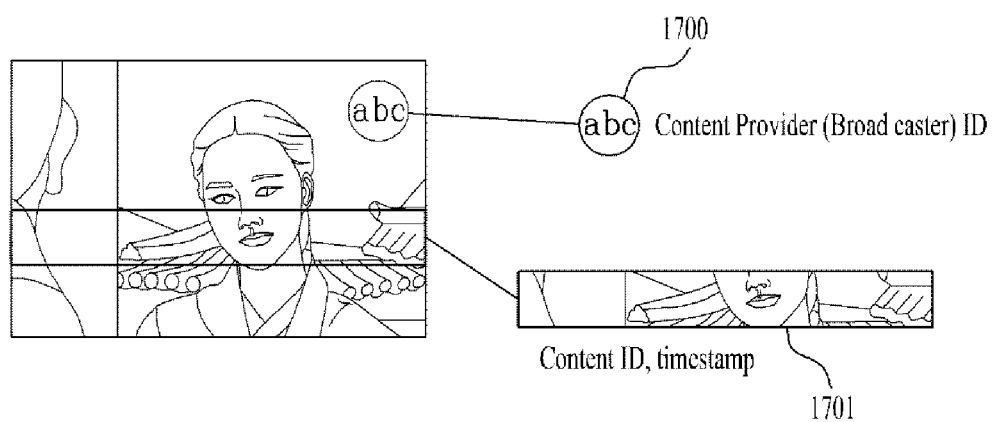
FIG. 17 is a diagram showing a method of embedding a watermark in a video frame according to another embodiment of the present invention.

FIG. 17 is a diagram showing a method of embedding a watermark in a video frame according to another embodiment of the present invention.

More specifically, FIG. 17 shows a method of embedding a plurality of watermarks including different content information (or metadata) into different areas of one video frame.

For example, as shown in FIG. 17, a watermark including CP ID information may be embedded in a logo area 1700 located at a right upper side of a screen and a watermark including a content ID and timestamp information may be embedded in a central area 1701 of the same screen.

A method of embedding the plurality of watermarks including different content information into one video frame may be largely divided into two methods according to the embodiment of the present invention.

A plurality of different watermarks may be embedded in different areas 1700 and 1701 of a video frame. At this time, the two or more areas 1700 and 1701 of the video frame, in which the watermark will be embedded, may be predefined according to the rules of the transmitter/receiver.

Alternatively, a separate watermark including information about the different areas 1700 and 1701 of the video frame may be first embedded. Different areas 1700 and 1701, in which the watermarks including content information will be embedded, may be detected through a separate watermark and the watermarks may be respectively embedded in the areas 1700 and 1701. The separate watermark may be embedded in a specific area or a logo part of the video frame and may be predefined according to the rules of the transmitter/receiver.

If the received video frame includes watermarks having different content information according to areas, first, the receiver acquires information about the area, in which the watermark is embedded, through another path or according to the rules of the transmitter/receiver. Using the acquired information, the watermark is extracted from each area of the video frame. According to the embodiment of the present invention shown in FIG. 17, the watermark including information about a content provider may be extracted from the logo area 1700 and the watermark including a content ID and time information may be extracted from the central area 1701 of the screen. Alternatively, if information for extracting different watermarks from the extracted watermarks (e.g., information about an area in which the watermark is embedded) is included, it is possible to extract the different watermarks using the information.

Figure 18:
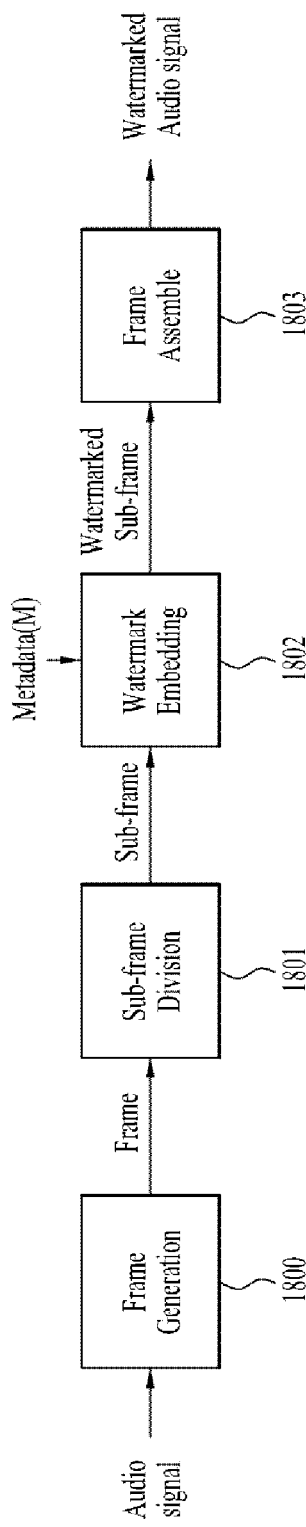
FIG. 18 is a diagram showing a method of embedding a watermark in an audio frame according to an embodiment of the present invention.

FIG. 18 is a diagram showing a method of embedding a watermark in an audio frame according to an embodiment of the present invention.

More specifically, FIG. 18 shows a process of embedding one watermark in an audio frame.

An original audio signal is divided into frames having a constant length (1800) and the divided audio frame is subdivided into subframes (1801). Using the subdivided subframes, an area in which a watermark will be embedded may be searched for (1802). For example, a frequency band higher than 4 kHz to which a human ear is sensitive may be searched for and determined as a watermark embedding area. The watermark is embedded in the searched area (1803) and the subframes are recombined into one audio signal (1803).

In addition, according to the embodiment of the present invention, a plurality of watermarks may be embedded in an audio signal based on the watermark embedding process shown in FIG. 18. The embedding method may include a method of respectively embedding watermarks to two or more different frequency bands and recombining the subframes into one audio signal and a method of embedding one watermark in continuous audio frames and embedding the other watermarks to different frequency bands.

According to the above-described embodiment of the present invention, if the audio signal in which the watermark is embedded is received, the receiver may first divide the audio signal into frames having a constant length in order to extract the watermark from the audio signal. The divided frame may be subdivided into subframes and the watermark extraction area may be detected from the subframes. The watermark is extracted from the detected area. If a plurality of watermarks is embedded in an audio signal, the watermarks may be extracted from the received audio signal at two or more frequency bands defined according to the rules of the transmitter/receiver. Alternatively, one watermark may be extracted from continuous audio frames and the other watermarks may be extracted from the signals of different frequency bands defined according to the rules of the transmitter/receiver. In addition, according to the embodiment of the present invention of the method of embedding the watermark described with reference to FIGS. 15 to 18, the watermark may be embedded in both audio content and video content.

If a watermark including the same content information may be embedded in both video and audio frames, the same watermark may be repeatedly embedded in the video and audio frames with a predetermined periodicity. According to such a method, since the receiver may simultaneously extract the same watermark from the video and audio frames in which the watermark is embedded, it is possible to improve accuracy of a result of extracting the watermark and to reduce a time consumed to finally acquire an accurate result.

Alternatively, watermarks may be divided according to content information included in the watermark and the divided watermarks may be embedded in video and audio frames. For example, the content information included in the watermark is divided into essential information for recognizing a broadcast program, such as a CP ID and a content ID, and additional information. The essential information may be embedded in a video frame and additional information may be embedded in an audio frame. On the contrary, the essential information may be embedded in an audio frame and additional information may be embedded in a video frame. Since the amount of information embedded in one video or audio frame is restricted, if the watermark is embedded using such a method, it is possible to increase the amount of metadata embedded during a predetermined time.

FIG. 19 is a diagram showing a method of embedding a profiled watermark according to an embodiment of the present invention.

As described with reference to FIG. 14, since the quality of A/V content may be deteriorated as the amount of content information stored in the watermark is increased, if the watermark is leveled according to type of information stored in the watermark, it is possible to efficiently utilize the watermark while maintaining the quality of content.

According to the embodiment of the present invention, after the watermark is profiled according to attributes of information stored in the watermark, the number of times of embedding the watermark in a content frame during a predetermined cycle may be differently set.

For example, information stored in the watermark may be divided into essential information for recognizing a broadcast program and additional information or information having a short change cycle and information having a long change cycle. The number of embedding the watermark including essential information and/or information having a short change cycle in the frame during a predetermined cycle may be increased and the number of embedding the watermark including additional information and/or information having a long change cycle in the frame during a predetermined cycle may be decreased.

More specifically, as shown in FIG. 19, a watermark including information necessary to recognize a program such as a CP ID and a content ID may be embedded in a logo area 1900 and a watermark including additional information such as URL information may be embedded in another specific area 1901 of the frame. In this case, the watermark of the logo area 1900 is data necessary to recognize the program and thus may be embedded in all video frames 1910, 1920 and 1930 and the watermark of the specific area 1901 of the frame for providing the additional information may be embedded in the two frames 1910 and 1930 once.

Figure 20:
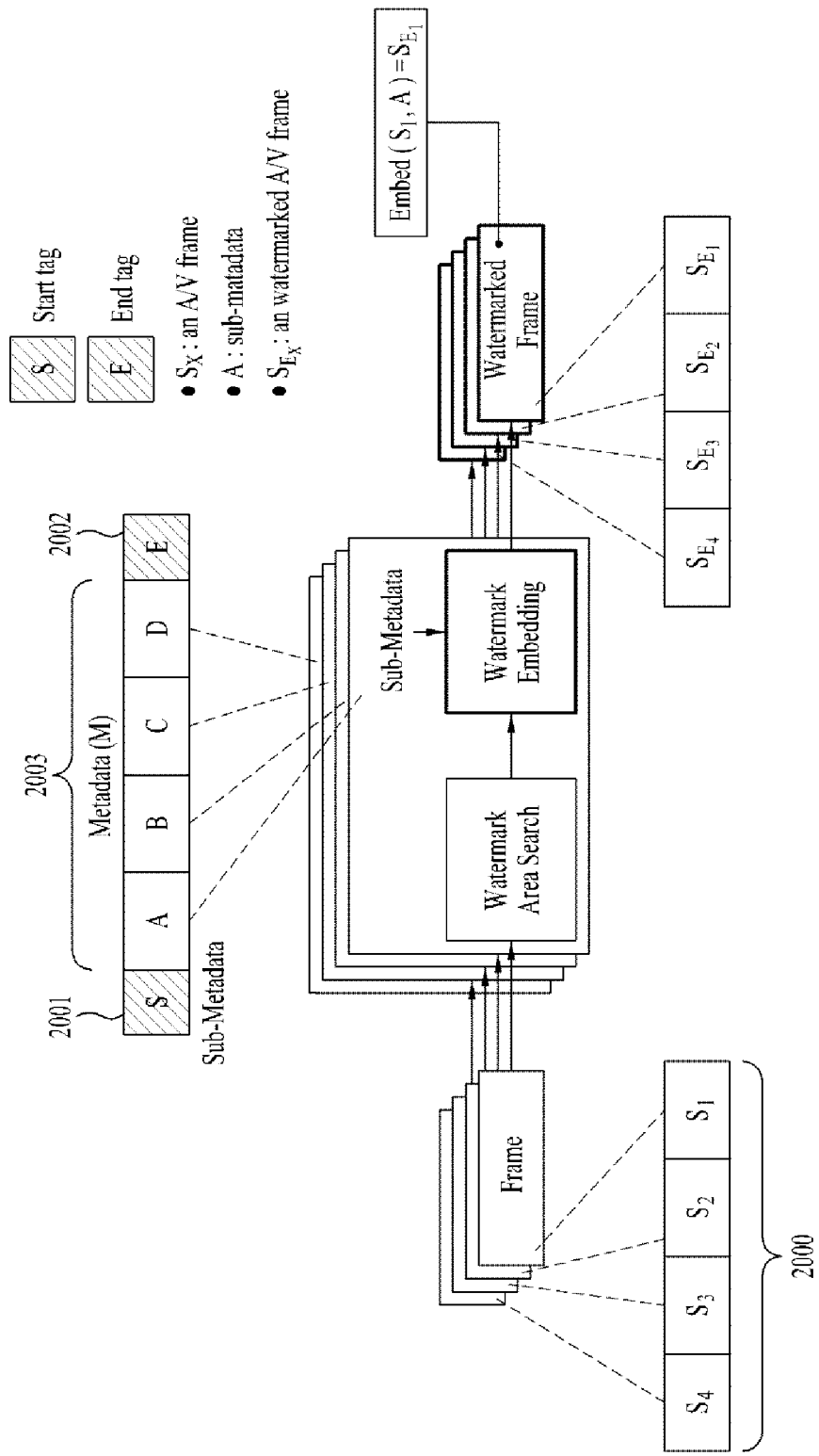
FIG. 20 is a diagram showing a method of embedding watermarks in continuous frames according to an embodiment of the present invention.
Figure 21:
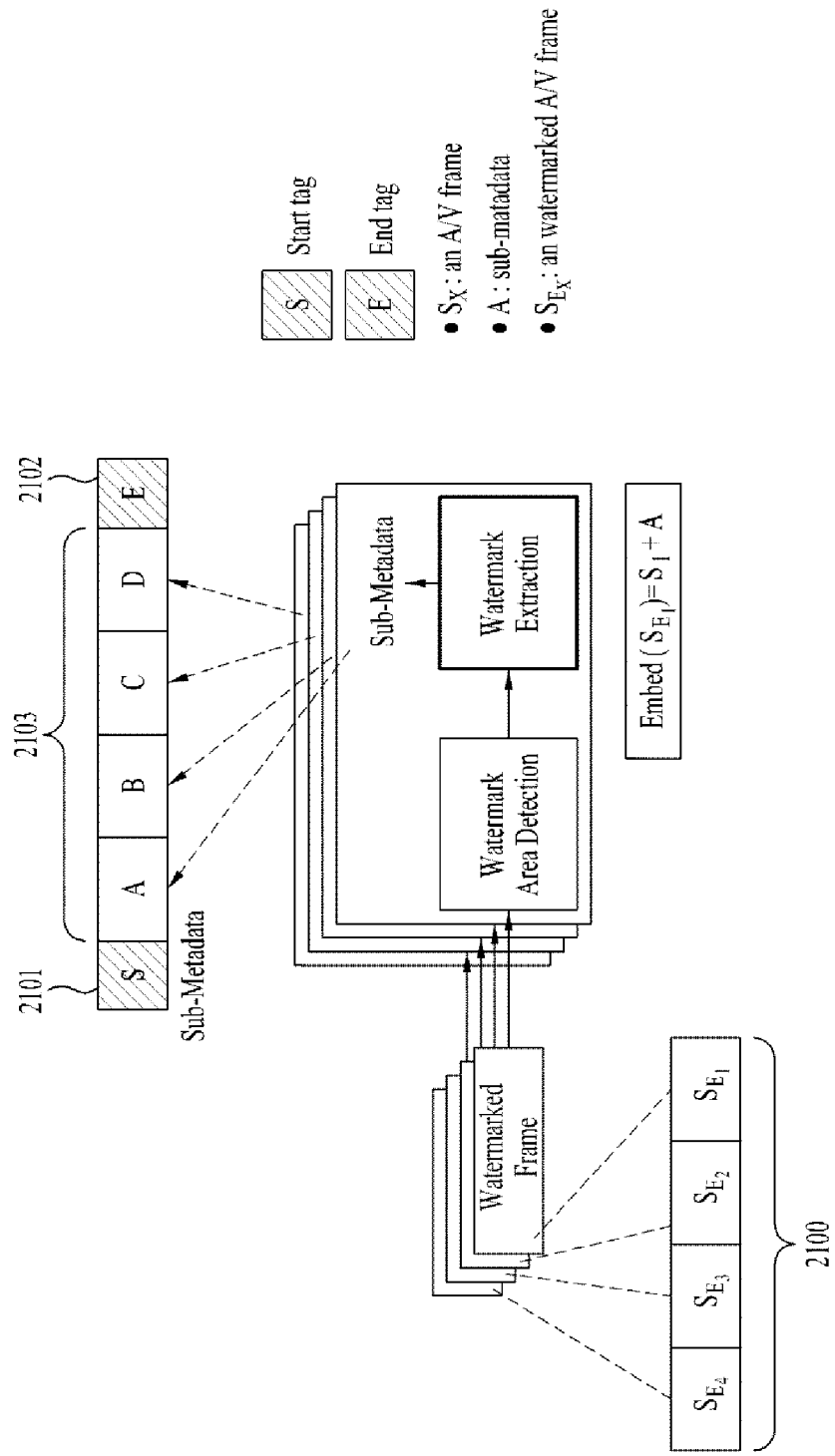
FIG. 21 is a diagram showing a method of extracting watermarks inserted into continuous frames according to an embodiment of the present invention.

FIGS. 20 and 21 show a method of embedding and extracting a watermark according to an embodiment of the present invention.

FIG. 20 is a diagram showing a method of embedding watermarks in continuous frames according to an embodiment of the present invention.

FIG. 21 is a diagram showing a method of extracting watermarks inserted into continuous frames according to an embodiment of the present invention.

The amount of content information which may be embedded in one A/V frame is restricted. According to the embodiment of the present invention shown in FIGS. 20 and 21, the watermark may include a large amount of content information.

As shown in FIG. 20, the content provider may embed the watermark including content information into continuous frames. In order to indicate the start and end of the content information, after a start tag 2001 indicating start information of content information and an end tag 2002 are embedded in content information, the content information is divided into sub content information 2003. The watermarks including the sub content information 2003 may be embedded in continuous A/V frames 200, respectively. In addition, if the watermarks are repeatedly embedded in the continuous A/V frames 2000 during a predetermined cycle, the receiver may efficiently extract the watermarks.

As shown in FIG. 21, the receiver may extract the watermarks from the continuous frames in which the watermarks are embedded. First, the receiver extracts the watermarks embedded in the continuous A/V frames. A start tag 2101 and an end tag 2102 of content information may be detected from the extracted watermarks. If the start information of the content information is acquired from the start tag 2101, the watermarks are extracted from the A/V frames received after the start tag 2101 has been detected so as to acquire sub content information 2103, and the acquired sub content information 2103 is combined. If the end information of the content information is acquired from the end tag 2102, the process of combining the sub content information 2103 is finished to acquire one piece of content information.

Figure 22:
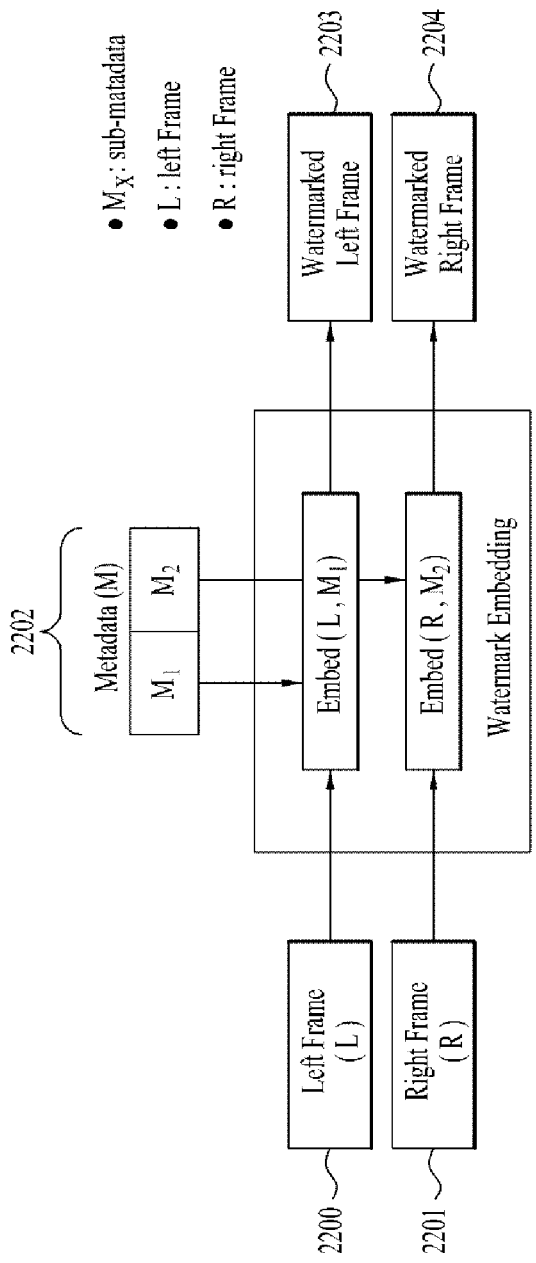
FIG. 22 is a diagram showing a method of embedding a watermark in a 3D video frame according to an embodiment of the present invention.

FIG. 22 is a diagram showing a method of embedding a watermark in a 3D video frame according to an embodiment of the present invention.

A full 3D video image may be implemented by acquiring a left image and a right image using two cameras, enabling a left eye to view the left image and enabling a right eye to view the right image. In the present invention, a method of embedding and extracting a watermark in and from a 3D video frame is proposed.

As shown in FIG. 22, the 3D video frame may include a left frame 2200 and a right frame 2201. A content provider may embed content information (or metadata) 2202 into the left frame 220 and the right frame 2201 and generate a left frame, in which the watermark is embedded, (hereinafter, referred to as a watermarked left frame) 2203 and a right frame, in which the watermark is embedded, (hereinafter, referred to as a watermarked right frame) 2204.

A standard definition (SD) or high definition (HD) image may be generated and transmitted.

First, the content provider may embed the watermark in only the left frame 2200 or the right frame 2201 and transmit the watermarked left and right frames to the receiver. The receiver may extract the watermark from one of the watermarked left frame 2203 or the watermarked right frame 2204. In this case, as described with reference to FIGS. 15 to 17, the method of embedding the watermark in the video frame and the method of extracting the watermark from the video frame may be applied. The watermarked video frame may be predefined according to the rules of the transmitter/receiver.

Second, the content provider may embed the watermark including the same content information into the left frame 2200 or the right frame 2201 and transmit the watermarked left and right frames to the receiver. The receiver may extract the watermark from each of the watermarked left frame 2203 or the watermarked right frame 2204. The extracted watermarks may be compared and corrected if the watermarks are identical or if a difference between the watermarks is within an allowed error range. In this case, the methods described with reference to FIGS. 15 to 17 are applicable to the method of inserting the watermark into the left frame 2200 or the right frame 2201 and the method of extracting the embedded mark. The watermark may be embedded in the left frame 2200 or the right frame 2201 using the same method or different methods. Although such a method may increase complexity when the receiver extracts the watermark, watermark extraction robustness may be increased.

Third, the content provider may embed different watermarks in the left frame 2200 or the right frame 2201 and transmit the watermarked left and right frames to the receiver. The receiver may extract the watermark from each of the watermarked left frame 2203 or the watermarked right frame 2204. The extracted watermark may include one piece of content information. Alternatively, content information included in the extracted watermark may be combined to generate one piece of new content information. In the latter case, content information greater in amount than the amount of content information transmittable via one video frame may be embedded in the video frame. Alternatively, content information which may be included in one video frame may be divided and embedded in the left frame 2200 or the right frame 2201. In this case, it is possible to reduce a possibility that the quality of image is deteriorated.

Figure 23:
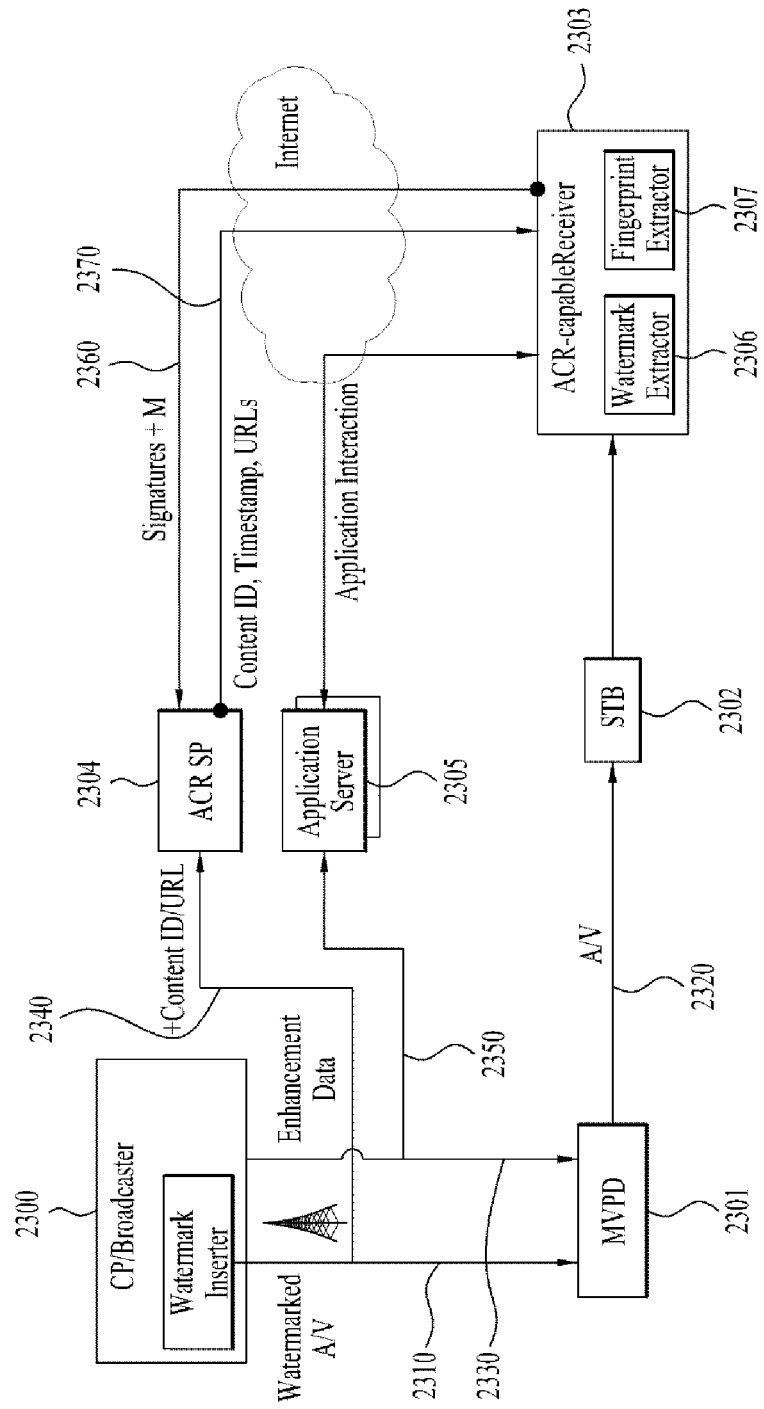
FIG. 23 is a diagram showing the structure of an ACR service provision system according to an embodiment of the present invention.

FIG. 23 is a diagram showing the structure of an ACR service provision system according to an embodiment of the present invention.

More specially, FIG. 23 shows an ACR service provision system for recognizing broadcast content using both watermarking and fingerprinting technologies according to one embodiment of the present invention.

In watermarking, a recognition ratio of content embedded in one frame is high but the quality of content may be deteriorated if a large amount of content information is embedded in a watermark. That is, the amount of embedded metadata is restricted.

In fingerprinting, the quality of content is not influenced but an ACR server for recognizing content is necessary. In addition, a time consumed to recognize content and a content recognition result depends on the size of a reference set.

According to the embodiment of the present invention shown in FIG. 23, if broadcast content is recognized by a combination of watermarking and fingerprinting technologies, it is possible to efficiently provide an ACR service while solving the problems of the two technologies.

The present invention includes a method of recognizing a broadcast program which is currently being viewed using two technologies. Metadata, which is used to recognize a program such as an identifier of a content provider or a broadcaster and needs to be most accurately recognized, may be embedded in broadcast A/V content and may be transmitted.

Hereinafter, a mechanism between components of an ACR service provision system shown in FIG. 23 will be described in detail.

If the content provider 2300 transmits watermarked A/V content and enhancement data to an MVPD 2301 (2310, 2330), the receiver 2303 may receive the A/V content through a set-top box 2302 but may not receive the enhancement data (2320). Accordingly, in order to enable the receiver 2303 to receive the enhancement data through another path, the content provider 2300 may transmit additional information of the A/V content to an ACR server 2304 (2340) and transmit the enhancement data to an application server 2305 (s250). The additional information of the A/V content may be information for delivering the enhancement data related to the A/V content to the receiver 2303 and may include a content ID, a timestamp, a URL, etc.

A watermark extractor 2306 of the receiver 2303 may extract a watermark from the received A/V content and, at the same time, a fingerprint extractor 2307 may extract a fingerprint signature from the A/V content. The receiver 2303 may transmit a query including the content information included in the watermark and the fingerprint signature to an ACR server 2304 (2360) and acquire the additional information of the A/V content from the ACR server 2304 (2360). Then, the receiver 2303 may receive the enhancement data from the application server 2305 using the additional information of the A/V content (2380). By including the watermarking result in the query, it is possible to reduce a time consumed to recognize the content at the ACR server and to improve content recognition accuracy of the ACR server.

Figure 24:
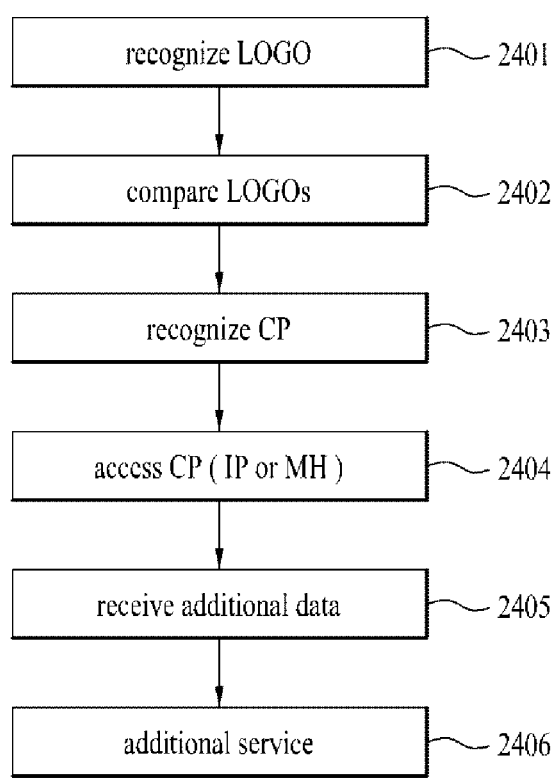
FIG. 24 is a diagram showing a method of providing an ACR service using a broadcaster a logo according to an embodiment of the present invention.

FIG. 24 is a diagram showing a method of providing an ACR service using a broadcaster a logo according to an embodiment of the present invention.

FIG. 25 is a diagram showing a broadcaster logo according to an embodiment of the present invention.

Figure 26:
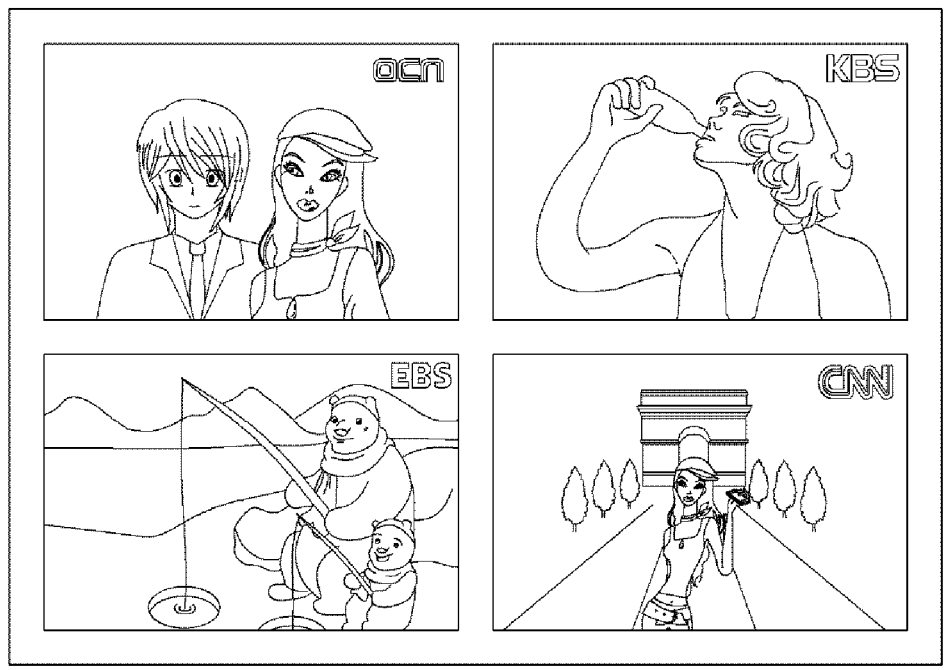
FIG. 26 is a diagram showing an ACR service using a broadcaster logo according to an embodiment of the present invention.

FIG. 26 is a diagram showing an ACR service using a broadcaster logo according to an embodiment of the present invention.

A content provider (or a broadcaster) has a logo indicating content thereof. For example, content providers may have logos shown in FIG. 25. The broadcaster or the content provider may insert a logo into a right upper side, a left upper side, a right lower side or a left lower side of a screen as shown in FIG. 26 so as to display content. Even when a video scene displayed on the screen is changed, the logo is not changed and is continuously displayed. In the present invention, an ACR service method of automatically recognizing information continuously displayed in a specific part of a screen using the property of a logo is proposed.

As shown in FIG. 24, according to the embodiment of the present invention, a watermark may be inserted into a logo to provide an ACR service. A receiver may recognize the logo to acquire content provider information indicating the logo and access the content provider to receive a service, thereby providing an ACR service. Hereinafter, a method of providing an ACR service using a logo will be described in detail.

First, the receiver may acquire logo information through a logo recognition step 2401 and a logo comparison step 2402. The receiver may acquire content provider information as a comparison result to recognize the content provider (2403) and access the content provider server (2404). Additional information of the content may be received from the content provider server (2405) to provide an additional server (2406).

The logo recognition step 2401 and the logo comparison step 2402 of the receiver may be performed by comparing the logo recognized by the receiver and the logos of the content providers pre-stored in the receiver.

Information about the stored logos is information received and stored by the receiver through an IP network or MH or default information stored in the receiver. New version information of the logo may be maintained. In case of information received via the IP network or MH, new logo information may be maintained by continuously receiving logo information through the IP network or MH and, in case of the default information, new logo information may be maintained through continuous update.

In the logo comparison step 2402, if the recognized logo is compared with all logo information stored in the receiver, the amount of information is large. Thus, a burden is imposed on the receiver. According to the embodiment of the present invention, since extraction, storage and comparison may be performed based on the detailed properties of the logo, it is possible to overcome such a restriction. For example, logo properties such as logo color, letter (SBS, CNN, etc.) and contour may be recognized to perform comparison. If a contour is used, a space in which the logo is displayed may be divided by coordinates to recognize the logo using the coordinate properties.

Figure 27:
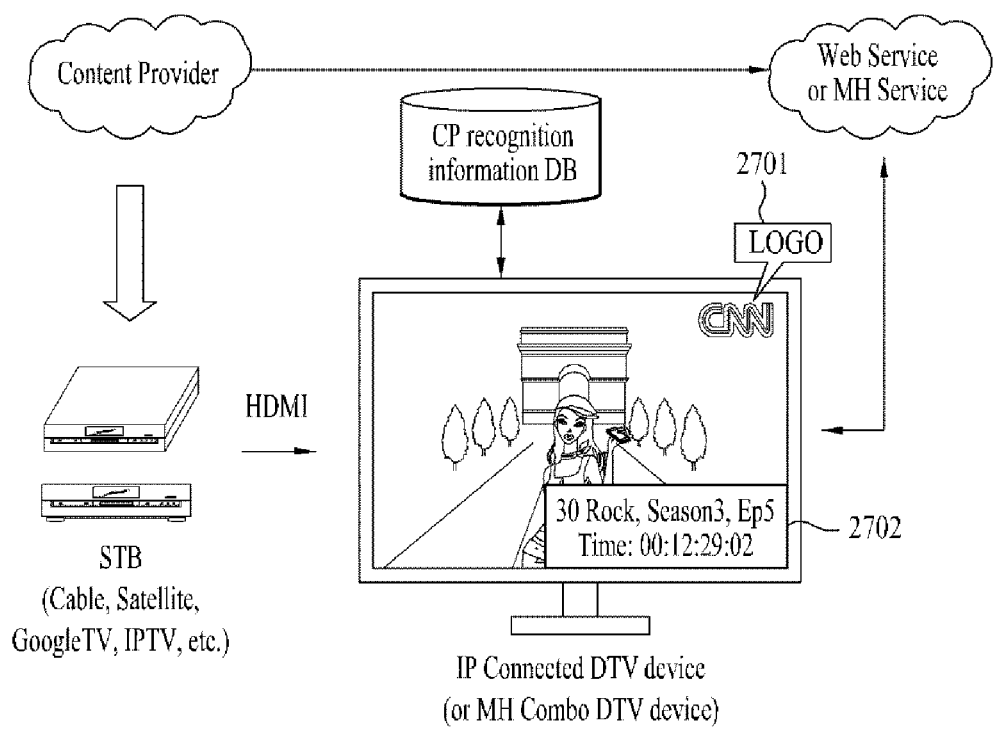
FIG. 27 is a diagram showing an ACR service provision method using a logo and a watermark according to an embodiment of the present invention.

FIG. 27 is a diagram showing an ACR service provision method using a logo and a watermark according to an embodiment of the present invention.

As shown in FIG. 27, in an ACR service, a receiver may extract logo information 2701 or a watermark 2702 to acquire information about a content provider and receive an additional service provided by a content provider through an IP network or MH.

As described above, if a watermark is embedded in content, the data of the content may be changed. Accordingly, in the present invention, a method of embedding a watermark in a logo area included in content is proposed.

Hereinafter, a method of utilizing logo information and a watermark at a receiver for an ACR service according to the embodiment of the present invention shown in FIG. 25 will be described in detail.

As described above, the receiver according to the embodiment of the present invention may extract and utilize a watermark including a predetermined amount of content information by a specific algorithm inserted into a specific field of A/V frame data when content is played back. For example, the receiver which receives video content including 30 frames per second may extract, from M frames, a watermark including data of N bits corresponding to a specific field or a specific location in each frame. In this case, the total amount of extracted watermark data may become N*M bits. If the number of watermarked frames is increased, the amount of watermark data to be extracted is increased. Therefore, a time consumed to extract the watermark at the receiver may be increased and the quality of the A/V content processed by the receiver may be deteriorated.

Accordingly, in the present invention, a method of embedding a watermark in a logo area included in a video frame is proposed. The logo area is included in all video frames and may be displayed at the same location on a screen even when a playback screen is changed. Accordingly, even when the amount of data is large, if a watermark is embedded in a logo area, it is possible to reduce a time consumed to extract a watermark and to decrease a possibility that the quality of A/V content is deteriorated.

Hereinafter, a method of embedding a watermark in a logo according to one embodiment of the present invention will be described. The method of embedding the watermark in the logo according to the embodiment of the present invention may include a method of embedding bar code data at a predetermined location of a logo, a method of utilizing a metadata packet of logo information as a watermark and a method of embedding a watermark in a part of image data of a logo.

In case of the method of embedding the bar code data at the predetermined location of the logo, the receiver may recognize the bar code data located at a specific location as a watermark. In this case, the bar code data is not displayed.

In the method of utilizing the metadata packet of the logo information as the watermark, the metadata packet describing the logo is used as the watermark while the original form of image data of the logo is maintained. In this case, the metadata packet may include a CP ID, a content ID, time information, etc.

In the method of embedding the watermark in the logo information, N logo frames are combined using bits of the part of the image data of the logo and N watermark bits are embedded in the logo image data. In this case, content information or metadata included in the watermark is as described above.

Figure 28:
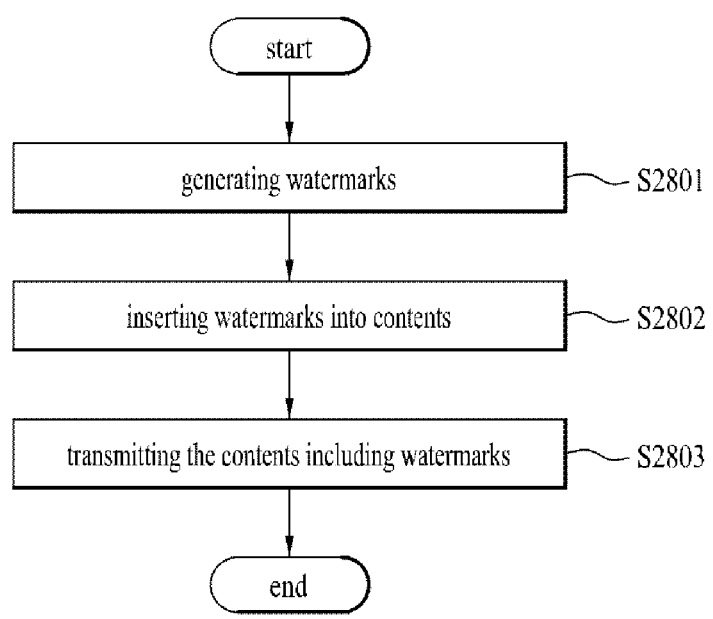
FIG. 28 is a diagram showing a method of processing an ACR service related to a broadcast program according to an embodiment of the present invention.

FIG. 28 is a diagram showing a method of processing an ACR service related to a broadcast program according to an embodiment of the present invention.

More specifically, FIG. 28 is a flowchart illustrating operation of a content provider according to the embodiment of the method of processing the ACR service related to the broadcast program of the present invention described with reference to FIGS. 15 to 22.

The content provider may generate a watermark (S2801)

The watermark may include channel information related to content and/or content information having URL information of content additional information. More specifically, as described with reference to FIG. 12, the watermark may include ID information of the content provider or the broadcaster and/or the ID information of the content. In addition, as described with reference to FIG. 14, the watermark may be leveled according to attributes of information included in the watermark.

The content provider may embed the generated watermark in the content (S2802).

The content provider may embed the watermark in a video frame and/or an audio frame.

If the watermark is embedded in a video frame, as described with reference to FIG. 15, the content provider may subdivide the frame of the video content into subframes and embed the watermark in the subdivided subframes. As described with reference to FIG. 16, the content provider may embed the watermark in a certain area of the video frame. As described with reference to FIG. 17, the content provider may embed a plurality of watermarks including different content information into different areas of one video frame.

If the watermark is embedded in an audio frame, as described with reference to FIG. 18, the content provider may subdivide one audio frame into subframes and embed the watermark in the subdivided subframe. As described with reference to FIG. 18, the content provider may embed a plurality of watermarks in one audio signal.

As described with reference to FIGS. 15 to 18, the content provider may embed the watermark in both audio content and video content. As described with reference to FIG. 20, the content provider may embed the watermark in continuous frames. As described with reference to FIG. 22, the content provider may embed the watermark in 3D content. As described with reference to FIGS. 24 to 27, the content provider may embed the watermark in the logo area.

If the watermark is leveled according to attributes of content information, as described with reference to FIG. 19, the content provider may change the cycle according to content information and embed the watermark in the frame. In this case, as described with reference to FIGS. 14 and 19, the leveled watermark may be embedded in the A/V content by changing the number of times of embedding the watermark according to level.

The content provider may transmit the content including the watermark (S2803).

Figure 29:
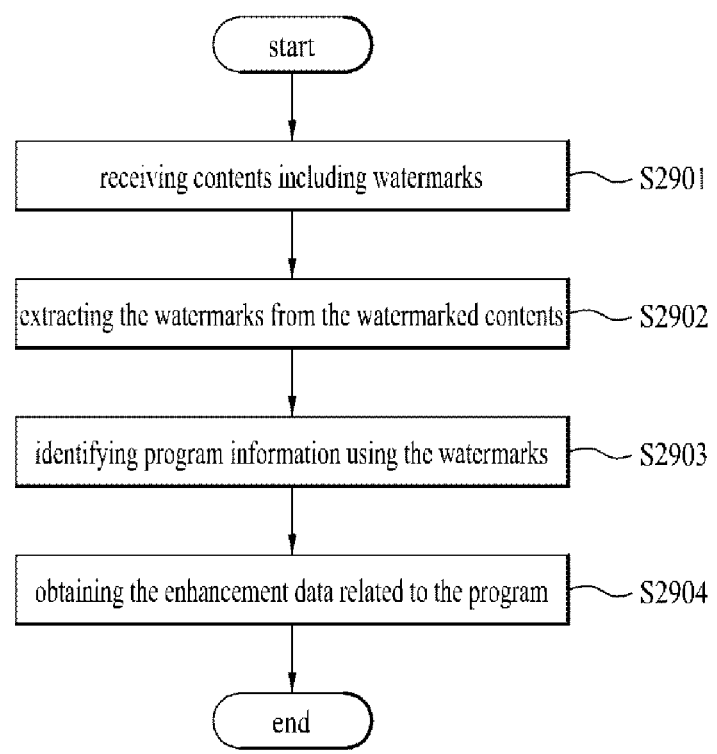
FIG. 29 is a diagram showing a method of processing an ACR service related to a broadcast program according to another embodiment of the present invention.

FIG. 29 is a diagram showing a method of processing an ACR service related to a broadcast program according to another embodiment of the present invention.

More specifically, FIG. 29 is a flowchart illustrating operation of a receiver according to the embodiment of the method of processing the ACR service related to the broadcast program of the present invention described with reference to FIGS. 15 to 22.

The receiver may receive content including a watermark (S2901).

The watermark may include channel information related to content and/or content information having URL information of content additional information. More specifically, as described with reference to FIG. 12, the watermark may include ID information of the content provider or the broadcaster and/or the ID information of the content. In addition, as described with reference to FIG. 14, the watermark may be leveled according to attributes of information included in the watermark.

The receiver may extract the watermark from a video and/or audio frame (S2902).

As described with reference to FIG. 28, the content provider may embed the watermark in the video and/audio frame. The receiver may receive the video and/or audio frame, in which the watermark is embedded, and extract the watermark. More specifically, as described with reference to FIG. 5, the receiver may use the micro-code to extract the watermark.

If the watermark is embedded in a video frame, as described with reference to FIG. 15, the receiver may subdivide one video frame into subframes, detect the subframe in which the watermark is embedded and extract the watermark. As described with reference to FIG. 16, the receiver may detect the bar data area from the subdivided subframe and extract the watermark. As described with reference to FIG. 17, the receiver may acquire information about the area, in which the watermark is embedded, and extract the watermark from each area of the video frame using the acquired information, if the video frame includes the watermark including content information which differs according to areas.

If the watermark is embedded in an audio frame, as described with reference to FIG. 18, the receiver may subdivide the audio signal into subframes, detect the watermark extraction area and extract the watermark.

As described with reference to FIG. 21, if the watermark is extracted from the continuous frames, the receiver may extract sub content information from the continuous frames, combine the sub content information using the start tag and the end tag, and acquire one piece of content information. In addition, as described with reference to FIG. 22, if the watermark is embedded in the 3D content, the receiver may extract the watermark from the left and/or right frame of the 3D content.

If the watermark is leveled according to attributes of content information, as described with reference to FIG. 19, the content provider may change the cycle according to content information and embed the watermark in the frame. In this case, as described with reference to FIGS. 14 and 19, the receiver may discriminatorily extract the watermarks discriminatorily embedded according to the profile of the watermark.

The receiver may acquire additional information through an IP network using the extracted watermark (S2903).

More specifically, as described with reference to FIG. 23, the method of processing the ACR service related to the broadcast program of the present invention may include the method of processing the ACR service by combining watermarking and fingerprinting.

According to the present invention, it is possible to identify information regarding a broadcast program in real time using ACR technology.

According to the present invention, it is possible to receive enhancement data related to a broadcast program using an ACR function so as to have an improved TV viewing experience.

According to the present invention, by recognizing information regarding a broadcast program and receiving enhancement data using watermarking technology, a TV receiver can perform an ACR function alone without a separate ACR server.

According to the present invention, it is possible to profile a watermark according to information included in the watermark and efficiently utilize watermarking even when the amount of information included in the watermark is large.

According to the present invention, by combining watermarking and fingerprinting, it is possible to efficiently provide an ACR service.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of providing an interactive service related to a content, the method comprising:
    receiving the content having watermarks, wherein the watermarks are inserted in audio or video frames of the contents, wherein the watermarks carry channel information related to the contents, and content information having URL information for additional data for the interactive service of the content, wherein a watermark in one of the frames includes a first-level watermark and a second-level watermark as an extension for the first-level watermark, wherein the first-level watermark includes a CP (Content Provider) identifier and a first extension indicator, wherein the CP identifier identifies a provider of the content, wherein the first extension indicator indicates whether the first-level watermark has extension, wherein the second-level watermark includes a content identifier and a timestamp, wherein the content identifier identifies the content, wherein the timestamp includes timing information for the content;
    extracting the first-level watermark from the one of the frames to obtain information in the first-level watermark;
    extracting the second-level watermark based on the first extension indicator to obtain information in the second-level watermark;
    providing the interactive service of the content based on the CP identifier, the content identifier and the timestamp.

2. The method of claim 1,
    wherein the watermark in the one of the frames further includes a third-level watermark as an extension for the second-level watermark,
    wherein the second-level watermark further includes a second extension indicator indicating whether the second-level watermark has extension,
    wherein the third-level watermark includes the URL information for the additional data.

3. The method of claim 1,
    wherein the watermarks are inserted into the audio or video frames with different periods depending on how many extensions the watermarks have.

4. The method of claim 1,
    wherein the first-level watermark further includes a region information indicating a region that the second-level watermark is inserted,
    wherein the second-level watermark is extracted by detecting the region that the region information is indicating.

5. The method of claim 1, wherein a combination of the CP identifier and the content identifier is used for identifying the content that the interactive service is targeting, wherein the timestamp provides a time base of the content for providing the related interactive service.

6. The method of claim 1, the extracting the first-level watermarks further includes extracting the first-level watermarks from logo data areas.

7. The method of claim 1, when the content is a 3D(three-dimensional) content, the first-level watermark is inserted in left video frame of the content, and the second-level watermark is inserted in right video frame of the content.

8. The method of claim 2, wherein the method further includes, extracting the third-level watermark based on the second extension indicator to obtain information in the third-level watermark; obtaining the additional data over an IP (Internet Protocol) network by using the URL information; providing the interactive service of the content by using the obtained additional data.

9. A method of providing an interactive service related to a content, the method comprising:
    generating watermarks;
    inserting the generated watermarks into audio or video frames of a content, wherein the watermarks carry channel information related to the content, and content information having URL information for additional data for the interactive service of the content wherein a watermark in one of the frames includes a first-level watermark and a second-level watermark as an extension for the first-level watermark,
    wherein the first-level watermark includes a CP (Content Provider) identifier and a first extension indicator, wherein the CP identifier identifies a provider of the content, wherein the first extension indicator indicates whether the first-level watermark has extension,
    wherein the second-level watermark includes a content identifier and a timestamp, wherein the content identifier identifies the content, wherein the timestamp includes timing information for the content
    wherein the CP identifier, the content identifier and the timestamp are used to provide the interactive service of the content; and
    transmitting the content.

10. The method of claim 9,
    wherein the watermark in the one of the frames further includes a third-level watermark as an extension for the second-level watermark,
    wherein the second-level watermark further includes a second extension indicator indicating whether the second-level watermark has extension,
    wherein the third-level watermark includes the URL information for the additional data.

11. The method of claim 9,
    wherein the watermarks are inserted into the audio or video frames with different periods depending on how many extensions the watermarks have.

12. The method of claim 9,
wherein the first-level watermark further includes a region information indicating a region that the second-level watermark is inserted,
wherein the second-level watermark is extracted by detecting the region that the region information is indicating.

13. The method of claim 9, wherein a combination of the CP identifier and the content identifier is used for identifying the content that the interactive service is targeting, wherein the timestamp provides a time base of the content for providing the related interactive service.

14. The method of claim 9, when the content is a 3D(three-dimensional) content, the inserting further includes inserting the first-level watermarks into left video frames, and inserting the second-level watermark into right video frames of the 3D content.

15. The method of claim 9, the inserting further includes inserting the first-level watermarks into logo data areas.

16. An apparatus for providing an interactive service related to a content, the apparatus comprising:
a receiving module configured to receive the content having watermarks, wherein the watermarks are inserted in audio or video frames of the contents, wherein the watermarks carry channel information related to the contents, and content information having URL information for additional data for the interactive service of the content,
wherein a watermark in one of the frames includes a first-level watermark and a second-level watermark as an extension for the first-level watermark, wherein the first-level watermark includes a CP (Content Provider) identifier and a first extension indicator, wherein the CP identifier identifies a provider of the content, wherein the first extension indicator indicates whether the first-level watermark has extension, wherein the second-level watermark includes a content identifier and a timestamp, wherein the content identifier identifies the content, wherein the timestamp includes timing information for the content;
an extracting module configured to extract the first-level watermark from the one of the frames to obtain information in the first-level watermark, and to extract the second-level watermark based on the first extension indicator to obtain information in the second-level watermark;
a providing module configured to provide the interactive service of the content based on the CP identifier, the content identifier and the timestamp.

17. The apparatus of claim 16,
wherein the watermark in the one of the frames further includes a third-level watermark as an extension for the second-level watermark,
wherein the second-level watermark further includes a second extension indicator indicating whether the second-level watermark has extension,
wherein the third-level watermark includes the URL information for the additional data.

18. The apparatus of claim 16,
wherein the watermarks are inserted into the audio or video frames with different periods depending on how many extensions the watermarks have.

19. An apparatus for providing an interactive service related to a content, the apparatus comprising:
a generating module configured to generate watermarks;
an inserting module configured to insert the generated watermarks into audio or video frames of a content, wherein the watermarks carry channel information related to the content, and content information having URL information for additional data for the interactive service of the content
wherein a watermark in one of the frames includes a first-level watermark and a second-level watermark as an extension for the first-level watermark,
wherein the first-level watermark includes a CP (Content Provider) identifier and a first extension indicator, wherein the CP identifier identifies a provider of the content, wherein the first extension indicator indicates whether the first-level watermark has extension,
wherein the second-level watermark includes a content identifier and a timestamp, wherein the content identifier identifies the content, wherein the timestamp includes timing information for the content
wherein the CP identifier, the content identifier and the timestamp are used to provide the interactive service of the content; and
a transmitting module configured to transmit the content.

20. The apparatus of claim 19,
wherein the watermark in the one of the frames further includes a third-level watermark as an extension for the second-level watermark,
wherein the second-level watermark further includes a second extension indicator indicating whether the second-level watermark has extension,
wherein the third-level watermark includes the URL information for the additional data.

* * * * *